United States Patent
Vermani et al.

(10) Patent No.: US 9,439,161 B2
(45) Date of Patent: Sep. 6, 2016

(54) PHYSICAL LAYER DESIGN FOR UPLINK (UL) MULTIUSER MULTIPLE-INPUT, MULTIPLE-OUTPUT (MU-MIMO) IN WIRELESS LOCAL AREA NETWORK (WLAN) SYSTEMS

(71) Applicant: QUALCOMM Incorporated, San Diego, CA (US)

(72) Inventors: Sameer Vermani, San Diego, CA (US); Rahul Tandra, San Diego, CA (US); Didier Johannes Richard Van Nee, Tull en't Waal (NL); Albert Van Zelst, Woerden (NL); Hemanth Sampath, San Diego, CA (US); Bin Tian, San Diego, CA (US)

( * ) Notice: Subject to any disclaimer, the term of this patent is extended or adjusted under 35 U.S.C. 154(b) by 120 days.

(21) Appl. No.: 14/332,301

(22) Filed: Jul. 15, 2014

(65) Prior Publication Data

US 2015/0023335 A1    Jan. 22, 2015

Related U.S. Application Data

(60) Provisional application No. 61/914,276, filed on Dec. 10, 2013, provisional application No. 61/892,946, filed on Oct. 18, 2013, provisional application No. 61/847,386, filed on Jul. 17, 2013, provisional application No. 61/983,365, filed on Apr. 23, 2014.

(51) Int. Cl.
*H04W 4/00* (2009.01)
*H04W 56/00* (2009.01)
(Continued)

(52) U.S. Cl.
CPC ....... *H04W 56/0035* (2013.01); *H04B 7/0404* (2013.01); *H04B 7/0452* (2013.01); *H04B 7/0684* (2013.01); *H04L 27/26* (2013.01); *H04L 27/261* (2013.01); *H04W 84/12* (2013.01)

(58) Field of Classification Search
CPC combination set(s) only.
See application file for complete search history.

(56) References Cited

U.S. PATENT DOCUMENTS

| 7,693,111 | B2 * | 4/2010 | Sondur | ............... H04L 27/2675 370/332 |
| 7,903,755 | B2 * | 3/2011 | Mujtaba | ............... H04L 27/261 375/295 |

(Continued)

FOREIGN PATENT DOCUMENTS

WO    WO-2006086493 A1    8/2006

OTHER PUBLICATIONS

International Search Report and Written Opinion—PCT/US2014/046879—ISA/EPO—Nov. 4, 2014.

*Primary Examiner* — Frank Duong
(74) *Attorney, Agent, or Firm* — Patterson & Sheridan, LLP

(57) ABSTRACT

Certain aspects of the present disclosure provide methods and apparatus for uplink (UL) multiuser multiple-input, multiple-output (MU-MIMO) transmissions in a High Efficiency WLAN (HEW) system. One example method generally includes generating a packet having a preamble portion and transmitting the packet. The preamble portion typically includes a long training field (LTF); a first signal (SIG) field subsequent to the LTF; one or more other LTFs located subsequent to the first SIG field; and at least one second SIG field, wherein all SIG fields in the preamble portion, other than the first SIG field, are subsequent to the one or more other LTFs. Another example method generally includes receiving, from an apparatus, a packet having a preamble portion comprising tone-interleaved LTFs; and performing frequency offset adjustment on the packet based on the tone-interleaved LTFs.

33 Claims, 25 Drawing Sheets

(51) Int. Cl.
  *H04B 7/04* (2006.01)
  *H04B 7/06* (2006.01)
  *H04L 27/26* (2006.01)
  *H04W 84/12* (2009.01)

(56) References Cited

U.S. PATENT DOCUMENTS

| | | | |
|---|---|---|---|
| 8,498,245 B2 * | 7/2013 | Wu | H04W 28/06 370/328 |
| 8,665,974 B2 * | 3/2014 | Zhang | H04L 27/2613 370/204 |
| 8,718,173 B2 * | 5/2014 | Lee | H04B 7/0452 375/259 |
| 2007/0097946 A1 | 5/2007 | Mujtaba | |
| 2011/0194655 A1 * | 8/2011 | Sampath | H04L 27/0014 375/341 |
| 2014/0307612 A1 | 10/2014 | Vermani et al. | |
| 2014/0369276 A1 * | 12/2014 | Porat | H04L 5/003 370/329 |

* cited by examiner

|  | LTF1 | LTF2 | LTF3 | LTF4 |
|---|---|---|---|---|
| Subband 1 | Streams 1 and 2 interleaved | Streams 3 and 4 interleaved | Streams 2 and 1 interleaved | Streams 4 and 3 interleaved |
| Subband 2 | Streams 3 and 4 interleaved | Streams 1 and 2 interleaved | Streams 4 and 3 interleaved | Streams 2 and 1 interleaved |

FIG. 16

PHYSICAL LAYER DESIGN FOR UPLINK (UL) MULTIUSER MULTIPLE-INPUT, MULTIPLE-OUTPUT (MU-MIMO) IN WIRELESS LOCAL AREA NETWORK (WLAN) SYSTEMS

CLAIM OF PRIORITY UNDER 35 U.S.C. §119

This application claims benefit of U.S. Provisional Patent Application Ser. No. 61/847,386, filed Jul. 17, 2013, U.S. Provisional Patent Application Ser. No. 61/892,946, filed Oct. 18, 2013, U.S. Provisional Patent Application Ser. No. 61/914,276, filed Dec. 10, 2013, and U.S. Provisional Patent Application Ser. No. 61/983,365, filed Apr. 23, 2014, each of which is hereby incorporated by reference in its entirety.

BACKGROUND

1. Field

Certain aspects of the present disclosure generally relate to wireless communications and, more particularly, to various physical layer (PHY) aspects for uplink (UL) multiuser multiple-input, multiple-output (MU-MIMO) transmissions.

2. Background

In order to address the issue of increasing bandwidth requirements demanded for wireless communications systems, different schemes are being developed to allow multiple user terminals to communicate with a single access point by sharing the channel resources while achieving high data throughputs. Multiple-input multiple-output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure generally relate to various PHY aspects for UL MU-MIMO transmissions. These PHY aspects may be used in any of various suitable radio access networks (RANs), such as HEW (High Efficiency WiFi or High Efficiency WLAN) systems.

Certain aspects of the present disclosure provide a method for wireless communications. The method generally includes generating a packet having a preamble portion and transmitting the packet. The preamble portion typically includes a long training field (LTF); a first signal (SIG) field subsequent to the LTF; one or more other LTFs located subsequent to the first SIG field; and at least one second SIG field, wherein all SIG fields in the preamble portion, other than the first SIG field, are subsequent to the one or more other LTFs.

Certain aspects of the present disclosure provide an apparatus for wireless communications. The apparatus generally includes a processing system configured to generate a packet having a preamble portion and a transmitter configured to transmit the packet. The preamble portion typically includes an LTF; a first SIG field subsequent to the LTF; one or more other LTFs located subsequent to the first SIG field; and at least one second SIG field, wherein all SIG fields in the preamble portion, other than the first SIG field, are subsequent to the one or more other LTFs.

Certain aspects of the present disclosure provide an apparatus for wireless communications. The apparatus generally includes means for generating a packet having a preamble portion and means for transmitting the packet. The preamble portion typically includes an LTF; a first SIG field subsequent to the LTF; one or more other LTFs located subsequent to the first SIG field; and at least one second SIG field, wherein all SIG fields in the preamble portion, other than the first SIG field, are subsequent to the one or more other LTFs.

Certain aspects of the present disclosure provide a non-transitory computer-readable medium (e.g., a computer-readable storage device, such as memory) having instructions executable to generate a packet having a preamble portion and to transmit the packet. The preamble portion typically includes an LTF; a first SIG field subsequent to the LTF; one or more other LTFs located subsequent to the first SIG field; and at least one second SIG field, wherein all SIG fields in the preamble portion, other than the first SIG field, are subsequent to the one or more other LTFs.

Certain aspects of the present disclosure provide a method for wireless communications. The method generally includes receiving one or more packets, each packet having a preamble portion, and processing the one or more packets according to the preamble portion. The preamble portion typically includes an LTF, a first SIG field subsequent to the LTF; one or more other LTFs located subsequent to the first SIG field, and at least one second SIG field. All SIG fields in the preamble portion, other than the first SIG field, are subsequent to the one or more other LTFs.

Certain aspects of the present disclosure provide an apparatus for wireless communications. The apparatus generally includes a receiver configured to receive one or more packets, each packet having a preamble portion, and a processing system configured to process the one or more packets according to the preamble portion. The preamble portion typically includes an LTF, a first SIG field subsequent to the LTF; one or more other LTFs located subsequent to the first SIG field, and at least one second SIG field. All SIG fields in the preamble portion, other than the first SIG field, are subsequent to the one or more other LTFs.

Certain aspects of the present disclosure provide an apparatus for wireless communications. The apparatus generally includes means for receiving one or more packets, each packet having a preamble portion, and means for processing the one or more packets according to the preamble portion. The preamble portion typically includes an LTF, a first SIG field subsequent to the LTF; one or more other LTFs located subsequent to the first SIG field, and at least one second SIG field. All SIG fields in the preamble portion, other than the first SIG field, are subsequent to the one or more other LTFs.

Certain aspects of the present disclosure provide a computer-readable medium including instructions executable to receive one or more packets, each packet having a preamble portion, and to process the one or more packets according to the preamble portion. The preamble portion typically includes an LTF, a first SIG field subsequent to the LTF; one or more other LTFs located subsequent to the first SIG field, and at least one second SIG field. All SIG fields in the preamble portion, other than the first SIG field, are subsequent to the one or more other LTFs.

Certain aspects of the present disclosure provide a method for wireless communications. The method generally includes generating one or more packets, each packet having a preamble portion, and transmitting the one or more packets. The preamble portion typically includes one or more high efficiency long training fields (HE-LTFs) and a high efficiency signal (HE-SIG) field located subsequent to the HE-LTFs.

Certain aspects of the present disclosure provide an apparatus for wireless communications. The apparatus generally includes a processing system configured to generate one or more packets, each packet having a preamble portion, and a transmitter configured to transmit the one or more packets. The preamble portion typically includes one or more HE-LTFs and an HE-SIG field located subsequent to the HE-LTFs.

Certain aspects of the present disclosure provide an apparatus for wireless communications. The apparatus generally includes means for generating one or more packets, each packet having a preamble portion, and means for transmitting the one or more packets. The preamble portion typically includes one or more HE-LTFs and an HE-SIG field located subsequent to the HE-LTFs.

Certain aspects of the present disclosure provide a computer-readable medium having instructions executable to generate one or more packets, each packet having a preamble portion, and to transmit the one or more packets. The preamble portion typically includes one or more HE-LTFs and an HE-SIG field located subsequent to the HE-LTFs.

Certain aspects of the present disclosure provide a method for wireless communications. The method generally includes receiving one or more packets, each packet having a preamble portion, and processing the one or more packets according to the preamble portion. The preamble portion typically includes one or more HE-LTFs and an HE-SIG field located subsequent to the HE-LTFs.

Certain aspects of the present disclosure provide an apparatus for wireless communications. The apparatus generally includes a receiver configured to receive one or more packets, each packet having a preamble portion, and a processing system configured to process the one or more packets according to the preamble portion. The preamble portion typically includes one or more HE-LTFs and an HE-SIG field located subsequent to the HE-LTFs.

Certain aspects of the present disclosure provide an apparatus for wireless communications. The apparatus generally includes means for receiving one or more packets, each packet having a preamble portion, and means for processing the one or more packets according to the preamble portion. The preamble portion typically includes one or more HE-LTFs and an HE-SIG field located subsequent to the HE-LTFs.

Certain aspects of the present disclosure provide a computer-readable medium including instructions executable to receive one or more packets, each packet having a preamble portion, and to process the one or more packets according to the preamble portion. The preamble portion typically includes one or more HE-LTFs and an HE-SIG field located subsequent to the HE-LTFs.

Certain aspects of the present disclosure provide a method of adjusting for a per-user phase offset. The method generally includes receiving, from one or more apparatuses, one or more packets, wherein each packet comprises a preamble portion and a data portion and wherein the data portion comprises a plurality of pilot signals; and determining a phase offset for at least one symbol in the data portion for at least one of the apparatuses, based on the plurality of pilot signals.

Certain aspects of the present disclosure provide an apparatus configured to adjust for a per-user phase offset. The apparatus generally includes a receiver and a processing system. The receiver is typically configured to receive, from one or more other apparatuses, one or more packets, wherein each packet comprises a preamble portion and a data portion and wherein the data portion comprises a plurality of pilot signals. The processing system is generally configured to determine a phase offset for at least one symbol in the data portion for at least one of the other apparatuses, based on the plurality of pilot signals.

Certain aspects of the present disclosure provide an apparatus capable of adjusting for a per-user phase offset. The apparatus generally includes means for receiving, from one or more other apparatuses, one or more packets, wherein each packet comprises a preamble portion and a data portion and wherein the data portion comprises a plurality of pilot signals; and means for determining a phase offset for at least one symbol in the data portion for at least one of the other apparatuses, based on the plurality of pilot signals.

Certain aspects of the present disclosure provide a computer-readable medium for adjusting for a per-user phase offset, the medium having instructions executable to receive, from one or more apparatuses, one or more packets, wherein each packet comprises a preamble portion and a data portion and wherein the data portion comprises a plurality of pilot signals; and to determine a phase offset for at least one symbol in the data portion for at least one of the apparatuses, based on the plurality of pilot signals.

Certain aspects of the present disclosure provide a method for handling residual frequency offset error. The method generally includes receiving a packet having a preamble portion and determining a frequency offset based on two symbols in the preamble portion having known data, wherein the two symbols are spaced further apart than a guard interval between consecutive symbols.

Certain aspects of the present disclosure provide an apparatus for handling residual frequency offset error. The apparatus generally includes a receiver configured to receive a packet having a preamble portion and a processing system configured to determine a frequency offset based on two symbols in the preamble portion having known data, wherein the two symbols are spaced further apart than a guard interval between consecutive symbols.

Certain aspects of the present disclosure provide an apparatus for handling residual frequency offset error. The apparatus generally includes means for receiving a packet having a preamble portion and means for determining a frequency offset based on two symbols in the preamble portion having known data, wherein the two symbols are spaced further apart than a guard interval between consecutive symbols.

Certain aspects of the present disclosure provide a computer-readable medium for handling residual frequency offset error, the medium having instructions executable to receive a packet having a preamble portion and to determine a frequency offset based on two symbols in the preamble portion having known data, wherein the two symbols are spaced further apart than a guard interval between consecutive symbols.

Certain aspects of the present disclosure provide a method for handling residual frequency offset error. The method generally includes receiving, from an apparatus, a packet having a preamble portion comprising tone-interleaved LTFs and performing frequency offset adjustment on the packet based on the tone-interleaved LTFs.

Certain aspects of the present disclosure provide an apparatus for handling residual frequency offset error. The apparatus generally includes a receiver configured to receive, from another apparatus, a packet having a preamble portion including tone-interleaved LTFs and a processing system configured to perform frequency offset adjustment on the packet based on the tone-interleaved LTFs.

Certain aspects of the present disclosure provide an apparatus for handling residual frequency offset error. The apparatus generally includes means for receiving, from another apparatus, a packet having a preamble portion comprising tone-interleaved LTFs and means for performing frequency offset adjustment on the packet based on the tone-interleaved LTFs.

Certain aspects of the present disclosure provide a computer-readable medium for handling residual frequency offset error, the medium having instructions executable to receive, from an apparatus, a packet having a preamble portion comprising tone-interleaved LTFs and to perform frequency offset adjustment on the packet based on the tone-interleaved LTFs.

Certain aspects of the present disclosure provide a method for wireless communications. The method generally includes receiving, at an apparatus, a packet having a preamble portion comprising one or more LTFs having a symbol duration greater than 1× (e.g., greater than 4 μs) and estimating a channel based on the LTFs.

Certain aspects of the present disclosure provide an apparatus for wireless communications. The apparatus generally includes a receiver configured to receive a packet having a preamble portion comprising one or more LTFs having a symbol duration greater than 1× and a processing system configured to estimate a channel based on the LTFs.

Certain aspects of the present disclosure provide an apparatus for wireless communications. The apparatus generally includes means for receiving a packet having a preamble portion comprising one or more LTFs having a symbol duration greater than 1× and means for estimating a channel based on the LTFs.

Certain aspects of the present disclosure provide a computer-readable medium having instructions executable to receive, at an apparatus, a packet having a preamble portion comprising one or more LTFs having a symbol duration greater than 1× and to estimate a channel based on the LTFs.

Certain aspects of the present disclosure provide a method for wireless communications. The method generally includes receiving, at an apparatus, a packet having a preamble portion comprising one or more LTFs, wherein the LTFs have an orthogonal cover applied to separate spatial streams in the time domain, and estimating a channel based on the LTFs.

Certain aspects of the present disclosure provide an apparatus for wireless communications. The apparatus generally includes a receiver configured to receive a packet having a preamble portion comprising one or more LTFs, wherein the LTFs have an orthogonal cover applied to separate spatial streams in the time domain, and a processing system configured to estimate a channel based on the LTFs.

Certain aspects of the present disclosure provide an apparatus for wireless communications. The apparatus generally includes means for receiving a packet having a preamble portion comprising one or more LTFs, wherein the LTFs have an orthogonal cover applied to separate spatial streams in the time domain, and means for estimating a channel based on the LTFs.

Certain aspects of the present disclosure provide a computer-readable medium having instructions executable to receive, at an apparatus, a packet having a preamble portion comprising one or more LTFs, wherein the LTFs have an orthogonal cover applied to separate spatial streams in the time domain, and to estimate a channel based on the LTFs.

Certain aspects of the present disclosure provide a method for wireless communications. The method generally includes generating, at an apparatus, one or more LTFs, applying a mapping to the LTFs to separate spatial streams in time, and transmitting a packet having a preamble portion including the mapped LTFs.

Certain aspects of the present disclosure provide an apparatus for wireless communications. The apparatus generally includes a processing system configured to generate one or more LTFs and to apply a mapping to the LTFs to separate spatial streams in time and a transmitter configured to transmit a packet having a preamble portion including the mapped LTFs.

Certain aspects of the present disclosure provide an apparatus for wireless communications. The apparatus generally includes means for generating one or more LTFs, means for applying a mapping to the LTFs to separate spatial streams in time, and means for transmitting a packet having a preamble portion including the mapped LTFs.

Certain aspects of the present disclosure provide a computer-readable medium having instructions executable to generate, at an apparatus, one or more LTFs, to apply a mapping to the LTFs to separate spatial streams in time, and to transmit a packet having a preamble portion including the mapped LTFs.

Certain aspects of the present disclosure provide a method for handling residual frequency offset error. The method generally includes receiving, at an apparatus, a packet having a preamble portion including LTFs, wherein for each LTF, a first spatial stream is associated with a first set of one or more subbands and a second spatial stream is associated with a second set of one or more subbands different than the first set; and performing frequency offset adjustment on the packet based on the LTFs.

Certain aspects of the present disclosure provide an apparatus for wireless communications. The apparatus generally includes a receiver configured to receive a packet having a preamble portion including LTFs, wherein for each LTF, a first spatial stream is associated with a first set of one or more subbands and a second spatial stream is associated with a second set of one or more subbands different than the first set; and a processing system configured to perform frequency offset adjustment on the packet based on the LTFs.

Certain aspects of the present disclosure provide an apparatus for wireless communications. The apparatus generally includes means for receiving a packet having a preamble portion including LTFs, wherein for each LTF, a first spatial stream is associated with a first set of one or more subbands and a second spatial stream is associated with a second set of one or more subbands different than the first set; and means for performing frequency offset adjustment on the packet based on the LTFs.

Certain aspects of the present disclosure provide a computer-readable medium for handling residual frequency offset error, the medium having instructions executable to receive, at an apparatus, a packet having a preamble portion including LTFs, wherein for each LTF, a first spatial stream is associated with a first set of one or more subbands and a second spatial stream is associated with a second set of one or more subbands different than the first set; and to perform frequency offset adjustment on the packet based on the LTFs.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 16 illustrates an example hybrid approach to LTF design for four spatial streams, mixing subband-based and tone-interleaved approaches, in accordance with certain aspects of the present disclosure.

DETAILED DESCRIPTION

Figure 1:
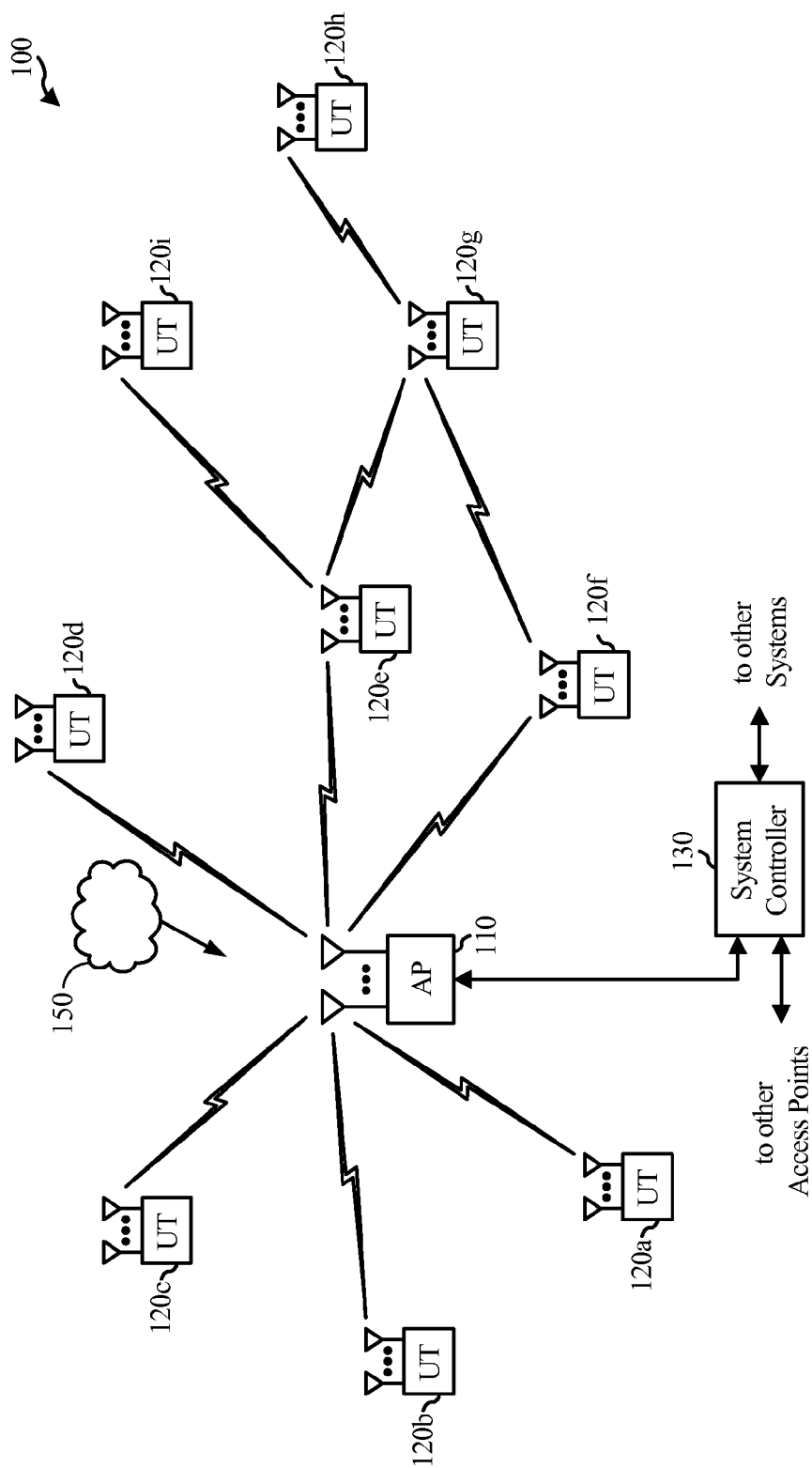
FIG. 1 is a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
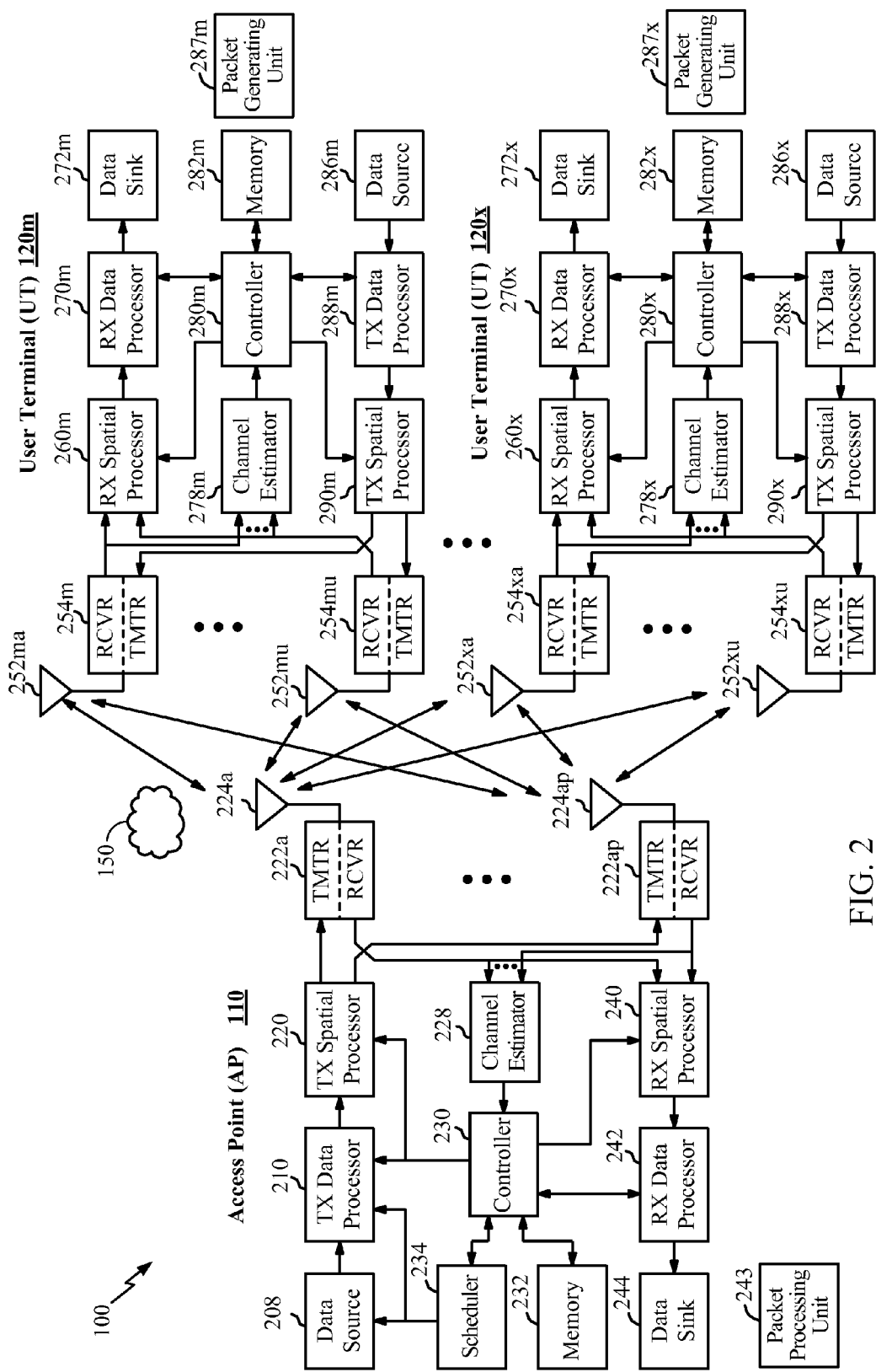
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,x}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3A:
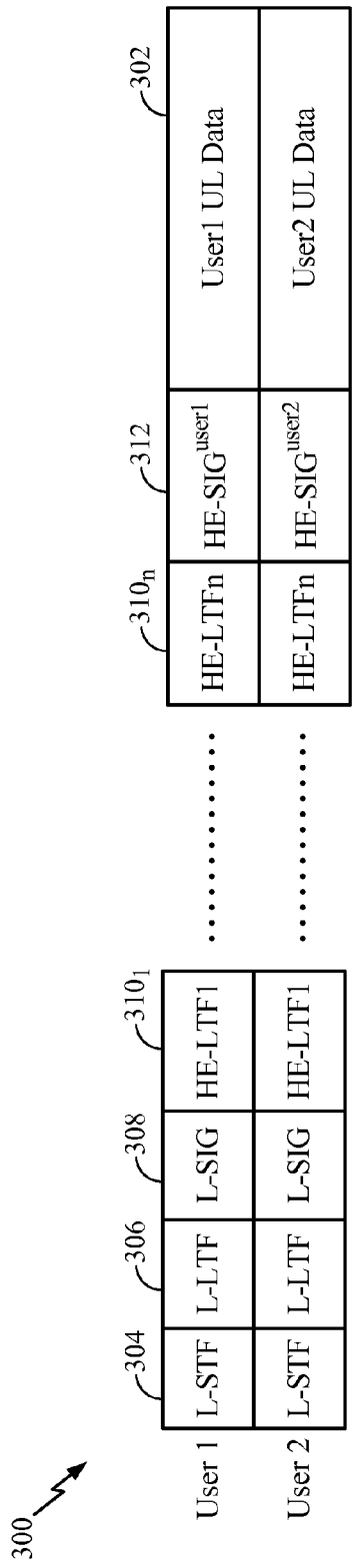
FIG. 3A illustrates an example mixed mode preamble format for uplink multiuser multiple input, multiple output (UL MU-MIMO) in High Efficiency WLAN (HEW) without a high efficiency short-training field (HE-STF), in accordance with certain aspects of the present disclosure.
Figure 3B:
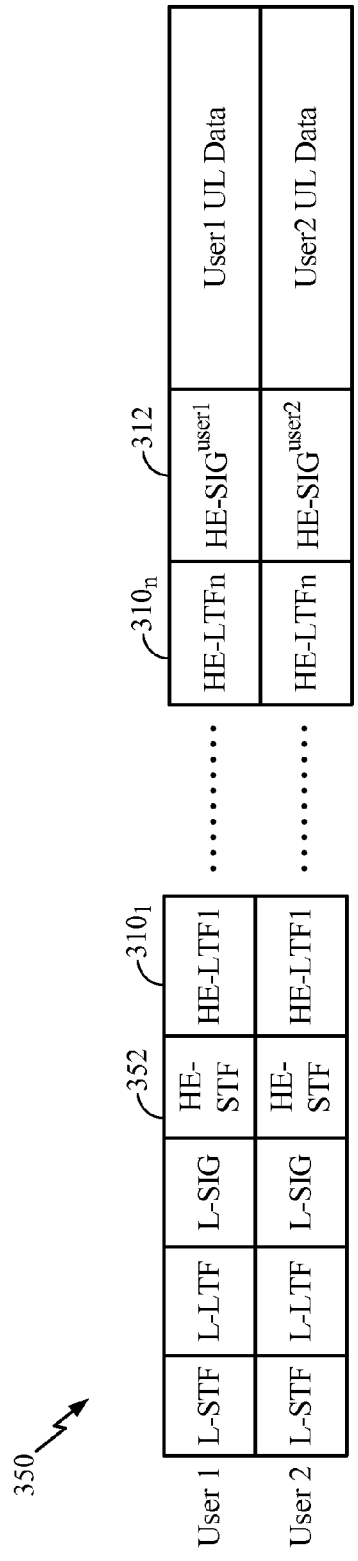
FIG. 3B illustrates an example mixed mode preamble format for UL MU-MIMO in HEW with an HE-STF, in accordance with certain aspects of the present disclosure.
Figure 3C:
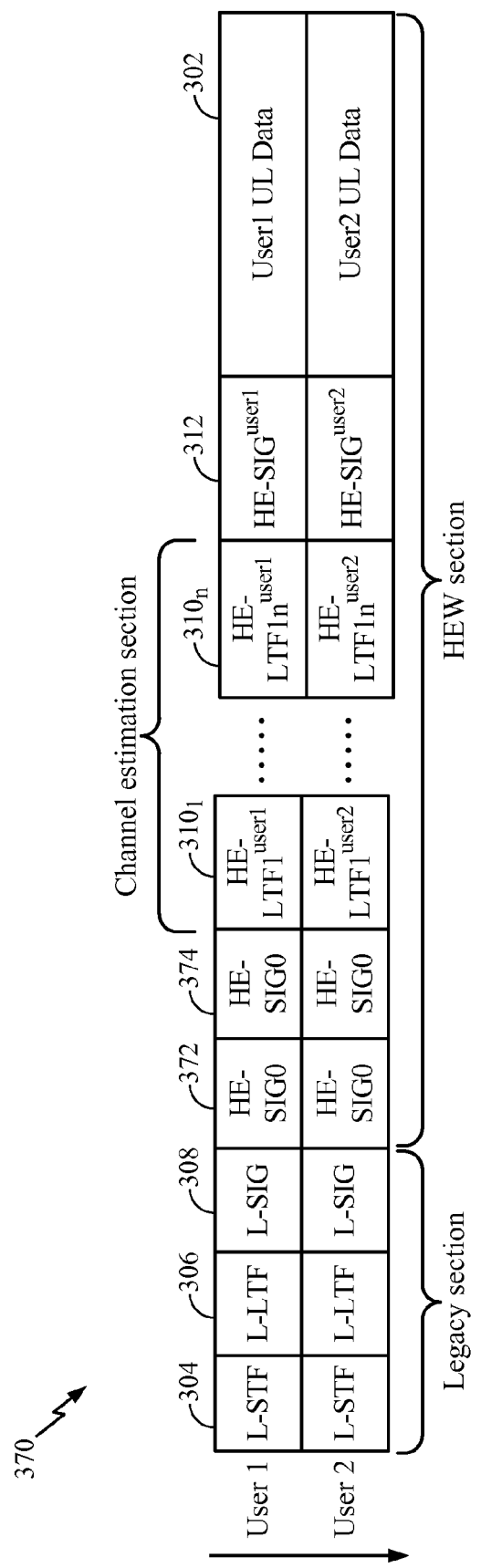
FIG. 3C illustrates an example mixed mode preamble format for UL MU-MIMO in HEW with a multiple real symbol HE-SIG0 in place of the HE-STF of FIG. 3B, in accordance with certain aspects of the present disclosure.
Figure 4:
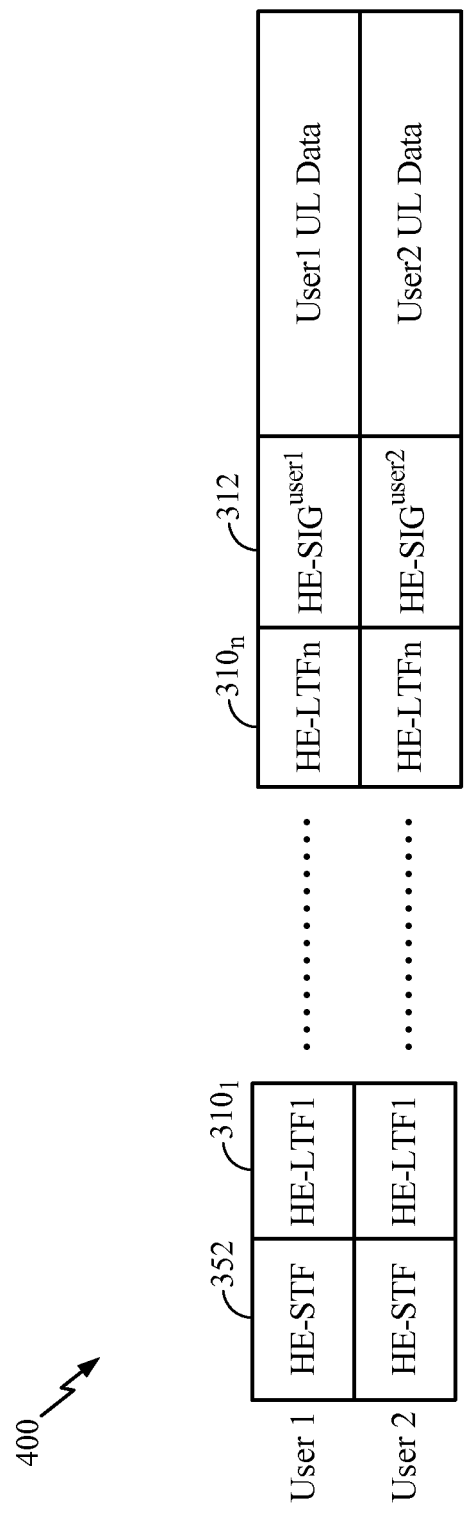
FIG. 4 illustrates an example Greenfield preamble format for UL MU-MIMO in HEW, in accordance with certain aspects of the present disclosure.

As illustrated, in FIGS. 1 and 2, one or more user terminals 120 may send one or more High Efficiency WLAN (HEW) packets 150, with a preamble format as described herein (e.g., in accordance with one of the example formats shown in FIGS. 3A-4), to the access point 110 as part of a UL MU-MIMO transmission, for example. Each HEW packet 150 may be transmitted on a set of one or more spatial streams (e.g., up to 4). For certain aspects, the preamble portion of the HEW packet 150 may include tone-interleaved LTFs, subband-based LTFs, or hybrid LTFs (e.g., in accordance with one of the example implementations illustrated in FIGS. 10-13, 15, and 16).

The HEW packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the HEW packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a HEW packet 150 based on the IEEE 802.11 HEW standard, but may interpret a legacy packet (e.g., a packet complying with IEEE 802.11a/b/g) in a different manner, according to the standards amendment associated therewith.

Example PHY Design for UL MU-MIMO in WLAN Systems

Certain aspects of the present disclosure provide preamble formats and other physical layer (PHY) aspects that may be used in advanced systems, such as HEW (High Efficiency WiFi or High Efficiency WLAN). These PHY aspects may build on ideas presented above and may be used for uplink (UL) multiuser multiple-input, multiple-output (MU-MIMO) transmissions.

UL MU-MIMO provides degrees of freedom gain and enables high UL network throughputs for clients (e.g., STAs) close to the AP 110, even when these clients have a limited number of antennas. However, UL MU-MIMO transmission from the clients may entail prior setup by an AP 110. This setup may involve stream allocation, a frequency correction reference (e.g., if performed at a STA for UL), a precise time to transmit in UL, and potential power control information.

UL MU-MIMO for HEW may involve similar specifications as DL MU-MIMO. For example, UL MU-MIMO may allow up to 8 spatial streams total with a maximum of 4 streams per station (STA). In addition, a maximum of 4 users may be permitted per UL MU-MIMO transmission.

Option 1a: Mixed Mode Preamble Format

FIG. 3A illustrates an example mixed mode preamble format 300 for UL MU-MIMO in High Efficiency WLAN (HEW), in accordance with certain aspects of the present disclosure. While a data portion 302 of the frame format is shown in FIG. 3A, the data portion is not part of the preamble portion of the frame format. The data portion 302 includes UL data for each spatial stream transmitted by each user.

The preamble portion includes a legacy portion, which includes three fields: a legacy short training field (L-STF) 304, a legacy long training field (L-LTF) 306, and a legacy signal (L-SIG) field 308. The legacy portion is followed by the HEW portion of the preamble format 300. The HEW portion includes a number (n) of high efficiency long training fields (HE-LTFs) $310_1$ to $310_n$ (collectively "HE-LTFs 310"), followed by a high efficiency signal (HE-SIG) field 312. The number of HE-LTFs 310 is determined by the total number of uplink streams, which may be the same as that for downlink (DL) MU-MIMO.

Prior to the uplink transmit opportunity (TXOP), the AP 110 may inform the client which streams to use and the maximum TXOP duration. The client can still decide the modulation and coding scheme (MCS) and the packet length (<max TXOP duration). The number of streams is an upper constraint. A lower number of streams in data may be transmitted by the client, but the number of LTFs should stay the same as the total number of streams decided by the AP 110 and provided in the AP's message transmitted to the client. For certain aspects, the client may transmit zeros on the unused stream(s). The maximum TXOP duration may be used as a spoof length by uplink clients in the L-SIG field. Each client may transmit an identical L-SIG field 308, but with different cyclic shifts. Cyclic shift delays (CSDs) here may most likely be much larger than legacy CSDs for accurate gain setting, which might cause issues for legacy devices which use cross-correlation.

For certain aspects, the L-SIG rate may be set to 9 Mbps, and the length of the L-SIG field 308 may be used to spoof legacy devices to cover the UL MU-MIMO transmission. This ensures that IEEE 802.11n and 802.11ac devices do not apply a quaternary binary phase shift keying (QBPSK) check, such that this check does not potentially become confused by the HE-STF and/or the first HE-LTF.

One benefit of the mixed mode preamble format is that when a trigger message from the AP 110 is not heard by everyone (e.g., all the STAs), the L-SIG field 308 protects the DL acknowledgments (ACKs) around the STAs. However, the disadvantage is the inclusion of three extra symbols (e.g., L-STF 304, L-LTF 306, and L-SIG field 308).

Option 1b: Mixed Mode Preamble Format (with an HE-STF)

FIG. 3B illustrates another example mixed mode preamble format 350 for UL MU-MIMO in HEW, in accordance with certain aspects of the present disclosure. The only difference here compared to the preamble format 300 of FIG. 3A is that there is an HE-STF 352 with larger cyclic shifts in FIG. 3B. Each client (i.e., user) transmits an identical L-SIG field 308, but with different cyclic shifts (here, the L-SIG cyclic shifts can be smaller, so that there are no issues for legacy devices which use cross-correlation receivers).

The advantage of the mixed mode preamble format is described above, with the L-SIG field 308 protecting the DL ACKs around the STAs. The disadvantage of this format is the three extra symbols (L-STF 304, L-LTF 306, and L-SIG field 308).

Option 1c: Mixed Mode Preamble Format (with One or More Real Symbols in Place of the HE-STF)

As described above, the mixed mode preamble format has certain advantages. This preamble format helps interference issues with overlapping basic service set (OBSS) devices that do not hear an AP's trigger message This is accomplished by protecting the DL ACKs (sent in response to the UL MU messages) and preventing potential interference that the UL transmission could cause to transmissions in other basic service sets (BSSs). Furthermore, the mixed mode preamble format provides more time on the transmit (Tx) side, allowing more time for the Tx frequency to settle, potentially simplifying design specifications in the HEW section.

For a UL frame to get proper protection, devices may most likely perform a preamble detection (e.g., looking for a particular structure based on autocorrelation) and not an energy detection (e.g., based on summation of absolute values and determining whether the sum crosses a threshold), since energy detection is less sensitive. If identical to a high throughput short training field (HT-STF), an HE-STF 352 may most likely trigger IEEE 802.11n false positives (e.g., determining that the received packet is an 802.11n packet, rather than a HEW packet). Since the high throughput signal (HT-SIG) cyclic redundancy check (CRC) will fail for a HEW packet wrongly determined to be an IEEE 802.11n packet, the devices may most likely switch to energy detection.

An HT-STF has both real and imaginary components. Therefore, certain aspects of the present disclosure provide a preamble format with a real symbol at the location of the HE-STF 352 in FIG. 3B. As used herein, a real symbol generally refers to a symbol having only a real component (i.e., no imaginary component) or an imaginary component small enough (compared to the real component) that this symbol will not lead to the received packet being considered as an 802.11n packet. Using a real symbol at the location of the HE-STF 352 will cause 802.11n devices to determine that the received packet is an 802.11a packet and will ensure proper deferrals.

For certain aspects, the real symbol may also carry some information (e.g., the real symbol may be an HE-SIG symbol) which allows OBSS HEW devices (which have not heard the trigger message) to transmit opportunistically. This information may permit better medium re-use and deferrals. Example information may include an indication that the received packet is a UL packet, a basic service set (BSS) identifier (ID) or color, and/or clear channel assessment (CCA)-related information.

From the point of view of OBSS HEW devices, which do not hear the trigger message, these devices do not know if the received packet is a UL packet. It would be beneficial if these devices can detect that the packet is a HEW packet 150 and decode the first HE-SIG field after L-SIG to obtain the information described above (e.g., UL/DL, BSS ID or color, and/or CCA-related information).

In the preamble format for the DL, the first HE-SIG may be sent using delay spread protection. The same method of delay spread protection may be used for the first HE-SIG in UL MU-MIMO in an effort to harmonize the processing at third party HEW devices that do not hear the trigger message (and hence are not aware if this packet is UL or DL).

For certain aspects, a common HE-SIG0 may be employed to tell if the packet is UL or DL. A jointly encoded SIG-0 and SIG-1 may most likely lead to a more complicated classification.

FIG. 3C illustrates another example mixed mode preamble format 370 for UL MU-MIMO in HEW, in accordance with certain aspects of the present disclosure. The only difference in FIG. 3C compared to the preamble format 350 of FIG. 3B is that there are two real symbols 372, 374 of an HE-SIG0 field in place of the HE-STF 352 in FIG. 3B. In this case, the HE-SIG0 field may have delay spread protection and, thus, may occupy more than one OFDM symbol, as illustrated in FIG. 3C. Since plain repetition is used in this example, real symbol 372 is a replica of real symbol 374 in the HE-SIG0 field.

Option 2: Greenfield Preamble Format

FIG. 4 illustrates an example Greenfield preamble format 400 for UL MU-MIMO in HEW, in accordance with certain aspects of the present disclosure. The number of HE-LTFs 310 is determined by the total number of uplink streams, which may be the same as downlink (DL) MU-MIMO.

Prior to the uplink transmit opportunity (TXOP), the AP 110 notifies the client which streams to use and the maximum TXOP duration. The client can still decide the modulation and coding scheme (MCS) and the packet length (<max TXOP duration). The number of streams is an upper constraint. A lower number of streams in data may be transmitted by the client, but the number of LTFs should stay the same as the total number of streams decided by the AP 110 and provided in the AP's message transmitted to the client. For certain aspects, the client may transmit zeros on the unused stream(s).

The main advantage of the Greenfield preamble format 400 is lower overhead (e.g., saves three symbols). However, the Greenfield preamble format 400 does not protect DL ACKs from nodes hidden from the AP 110.

For any of the preamble formats described above, the HE-SIG field 312 may contain any of various suitable fields. For example, the HE-SIG field 312 may include information regarding the MCS and/or a number of streams actually used (in case a number of streams less than the number of streams in the AP's setup message is allowed). The HE-SIG field 312 may also include information about space-time block coding (STBC), a coding rate, a cyclic redundancy check (CRC), a per-user length, or a tail portion. The per-user length may not be included if aggregated medium access control (MAC) protocol data unit (A-MPDU) is enforced.

Delay Spread Protection

According to certain aspects, lengthened symbol duration may be used for delay spread protection. The setup message transmitted by the AP 110 may indicate whether lengthened symbol duration should be used by a STA receiving the message. For certain aspects, a STA may not be allowed to decide this, because then the various STAs can make different decisions.

If the AP 110 requests a transmission with longer symbols, then for the mixed mode preamble formats, the legacy section uses a normal symbol duration, whereas subsequent fields have a longer symbol duration (e.g., via increased fast Fourier transform (FFT) size). For the Greenfield preamble format 400, the entire preamble portion uses the increased symbol duration (e.g., via increased FFT size) from the beginning of the HEW packet (e.g., from the HE-STF 352).

Figure 5:
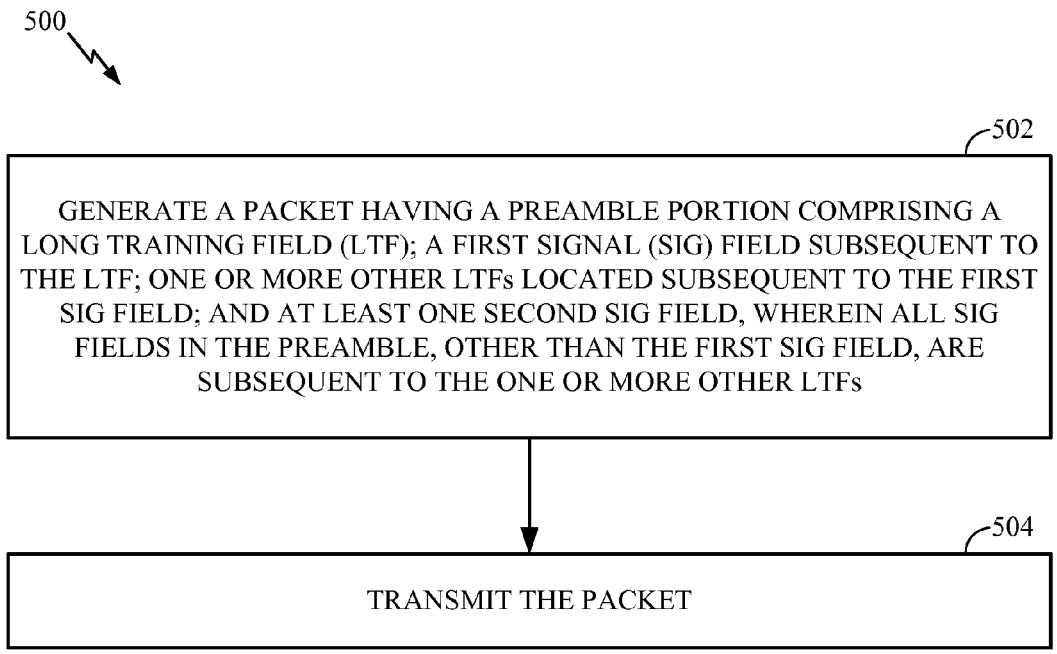
FIG. 5 is a flow diagram of example operations for generating and transmitting a packet, wherein all signal (SIG) fields in a preamble of the packet, other than the first SIG field, are subsequent to one or more long training fields (LTFs), in accordance with certain aspects of the present disclosure.

FIG. 5 is a flow diagram of example operations 500 for generating a packet, in accordance with certain aspects of the present disclosure. The operations 500 may be performed by an apparatus, such as a STA. As used herein, a packet may refer to a protocol data unit (e.g., a physical layer convergence procedure (PLCP) protocol data unit (PPDU) or a medium access control (MAC) protocol data unit (MPDU)) or may be used interchangeably with the term "frame."

The operations 500 may begin, at 502, with the STA generating a packet (e.g., a HEW packet 150). The packet may have a preamble portion including a long training field (LTF), a first signal (SIG) field subsequent to the LTF, one or more other LTFs located subsequent to the first SIG field, and at least one second SIG field. All SIG fields in the preamble portion, other than the first SIG field, are subsequent to the one or more other LTFs. At 504, the STA may transmit the packet (e.g., to another apparatus, such as an access point 110).

As used herein, the term "subsequent" in the sense of a packet (or frame) generally refers to the various fields within the packet having a certain order or position. This order may be defined as increasing when reading from left to right. In this sense, for example, the first SIG field described above is positioned to the right of the LTF and, therefore, is located subsequent to the LTF (i.e., the first SIG field follows the LTF).

According to certain aspects, the at least one second SIG field is the only signal field in the preamble portion providing parameters for decoding a data portion (e.g., data portion 302) of the packet. The packet may be transmitted as an uplink (UL) multiuser (MU) multiple-input, multiple-output (MIMO) transmission. For certain aspects, the at least one second SIG field comprises at least one of an indication of a modulation and coding scheme (MCS), a number of spatial streams, an indication of space-time block coding (STBC), an indication of a coding rate, a cyclic redundancy check (CRC), a per-user length, or a tail portion. For certain aspects, the at least one second SIG field comprises at least one high efficiency signal (HE-SIG) field in accordance with the Institute of Electrical and Electronics Engineers (IEEE) 802.11 high efficiency WLAN (wireless local area network) (HEW) amendment or later amendments to the IEEE 802.11 standard. For certain aspects, the one or more other LTFs comprise one or more high efficiency long training fields (HE-LTFs) in accordance with IEEE 802.11 HEW (e.g., HE-LTFs 310).

According to certain aspects, the packet includes only two SIG fields including the first SIG field. For certain aspects, the two SIG fields are associated with only two symbols (e.g., occupy only two symbols in the packet).

According to certain aspects, the operations 500 may further include the STA receiving a message indicating using a lengthened symbol duration. In this case, generating the packet may involve generating the packet such that the LTF and the first SIG field have a shorter symbol duration than the one or more other LTFs and the at least one second SIG field.

According to certain aspects, the preamble portion also includes a short training field (STF) subsequent to the first SIG field and preceding the one or more other LTFs. The STF may have a larger cyclic shift than that of the first SIG field. For certain aspects, the STF is a high efficiency short training field (HE-STF) in accordance with the IEEE 802.11 HEW amendment or later amendments to the IEEE 802.11 standard (e.g., HE-STF 352).

According to certain aspects, the LTF comprises a legacy long training field (L-LTF) and the first SIG field comprises a legacy signal (L-SIG) field (e.g., in accordance with the IEEE 802.11a amendment to the IEEE 802.11 standard), such as L-LTF 306 and L-SIG field 308. For certain aspects, the LTF and the first SIG field are a first type of field, whereas the one or more other LTFs and the at least one second SIG field are a second type of field, different from the first type. For certain aspects, the first type complies with a first wireless communications standard (e.g., IEEE 802.11a), and the second type complies with a second wireless communications standard (e.g., IEEE 802.11 HEW), different than the first standard. The second standard may have a higher throughput than the first standard.

Figure 6:
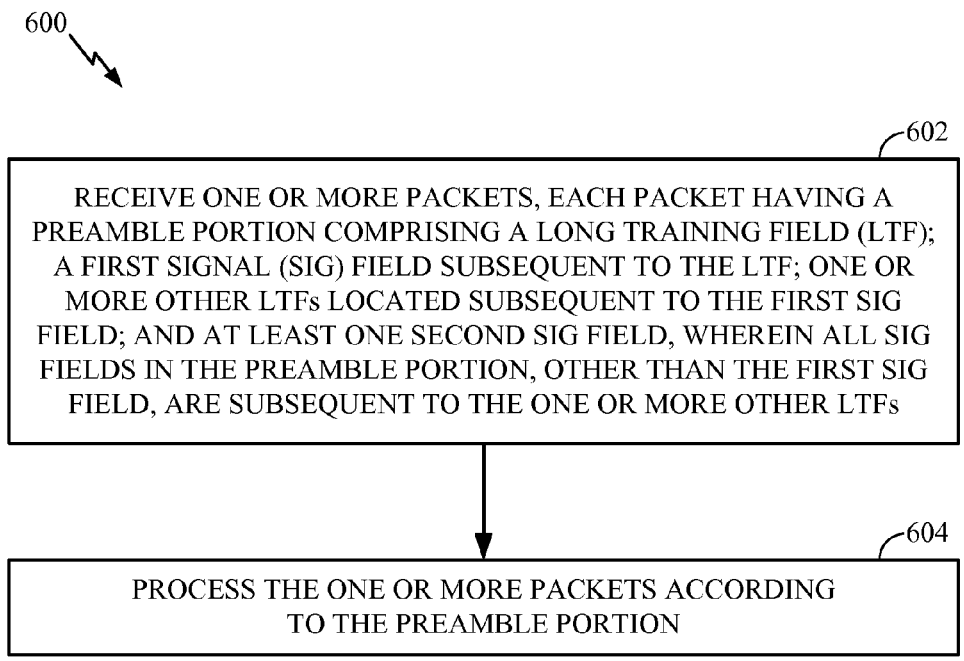
FIG. 6 is a flow diagram of example operations for processing one or more packets, wherein all SIG fields in a preamble of each packet, other than the first SIG field, are subsequent to one or more LTFs, in accordance with certain aspects of the present disclosure.
Figure 6A:
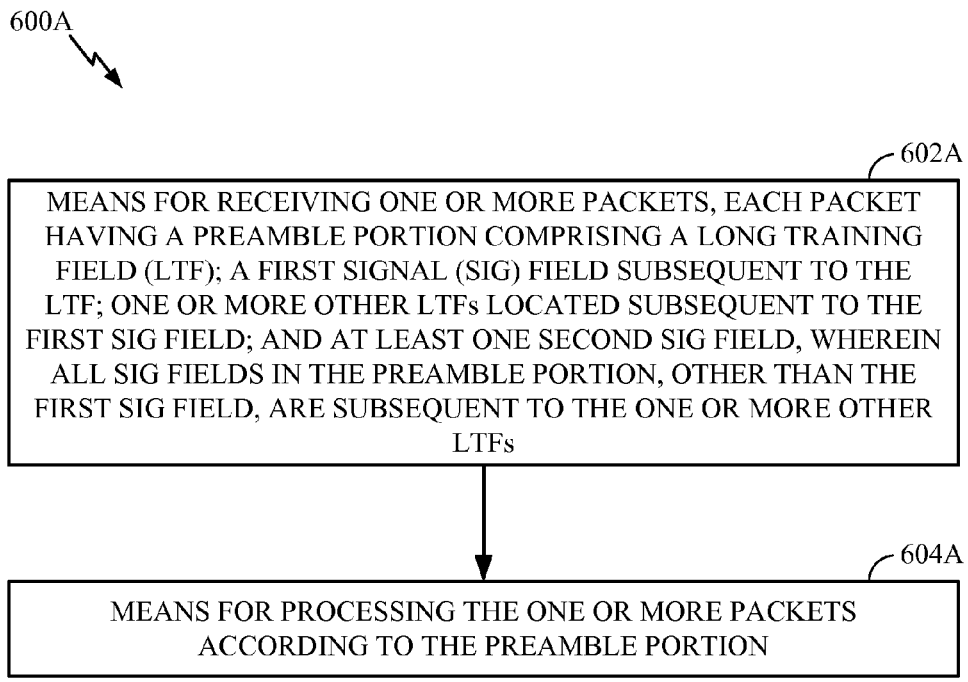
FIG. 6A illustrates example means capable of performing the operations shown in FIG. 6.

FIG. 6 is a flow diagram of example operations 600 for processing one or more packets, in accordance with certain aspects of the present disclosure. The operations 600 may be performed by an apparatus, such as an AP (e.g., access point 110).

The operations 600 may begin, at 602, with the AP receiving one or more packets (e.g., a HEW packet 150). Each packet has a preamble portion including an LTF, a first SIG field subsequent to the LTF, one or more other LTFs located subsequent to the first SIG field, and at least one second SIG field. All SIG fields in the preamble portion, other than the first SIG field, are subsequent to the one or more other LTFs.

At 604, the AP may process the one or more packets according to the preamble portion. According to certain aspects, the processing at 604 involves estimating a channel for each of the one or more packets based on the one or more other LTFs, spatially separating out the at least one second SIG field based on the estimated channel, and/or processing a data portion in each packet based on information in the at least one second SIG field.

According to certain aspects, the at least one second SIG field is the only signal field in the preamble portion providing parameters for decoding a data portion of each packet. The at least one second SIG field may include at least one of an indication of a modulation and coding scheme (MCS), a number of spatial streams, an indication of space-time block coding (STBC), an indication of a coding rate, a cyclic redundancy check (CRC), a per-user length, or a tail portion. For certain aspects, the at least one second SIG field comprises at least one high efficiency signal (HE-SIG) field in accordance with the IEEE 802.11 HEW amendment or later amendments to the IEEE 802.11 standard.

According to certain aspects, each packet includes only two SIG fields including the first SIG field. For certain aspects, the two SIG fields are associated with only two symbols.

According to certain aspects, the operations 600 may further involve transmitting a message indicating use of a lengthened symbol duration. In this case the LTF and the first SIG field may have a shorter symbol duration than the one or more other LTFs and the at least one second SIG field in the one or more received packets.

According to certain aspects, the preamble portion further includes a short training field (STF) subsequent to the first SIG field and preceding the one or more other LTFs. The STF may have a larger cyclic shift than that of the first SIG field. For certain aspects, the STF is a high efficiency short training field (HE-STF) in accordance with the IEEE 802.11 HEW amendment or later amendments to the IEEE 802.11 standard.

For certain aspects, the operations 600 may also include the AP transmitting a message indicating a number of spatial streams allocated for an apparatus (e.g., a STA). In this case, receiving the one or more packets involves receiving the one or more packets from the apparatus via fewer spatial streams than indicated by the number of allocated spatial streams. For certain aspects, each packet is associated with a set of one or more spatial streams and a different apparatus. The content of the at least one second SIG field is the same for each packet received from the same apparatus via a plurality of spatial streams.

Figure 7:
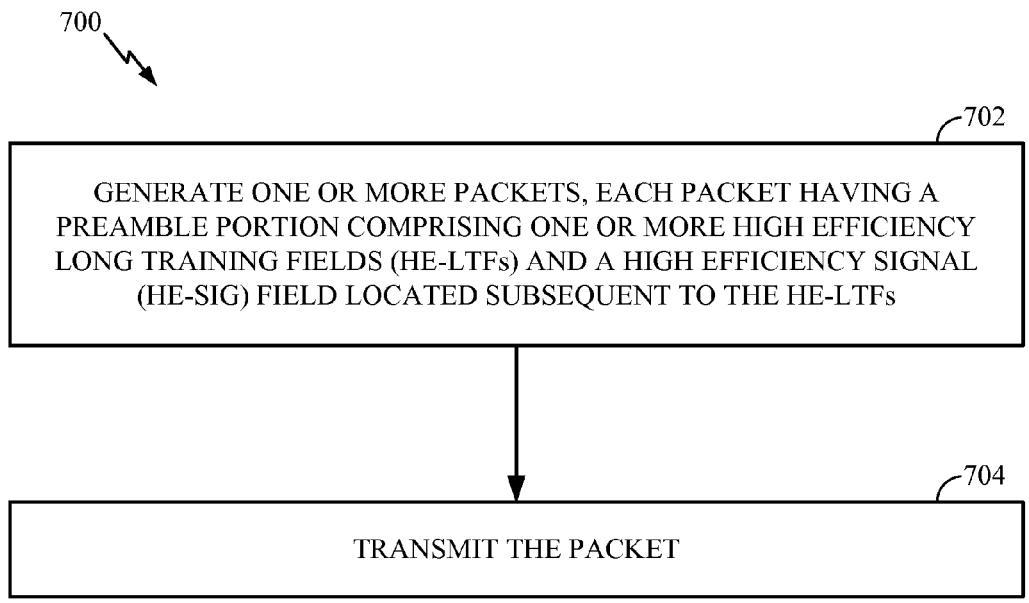
FIG. 7 is a flow diagram of example operations for generating a packet with a preamble portion comprising one or more high efficiency long training fields (HE-LTFs) and a high efficiency signal (HE-SIG) field, in accordance with certain aspects of the present disclosure.
Figure 7A:
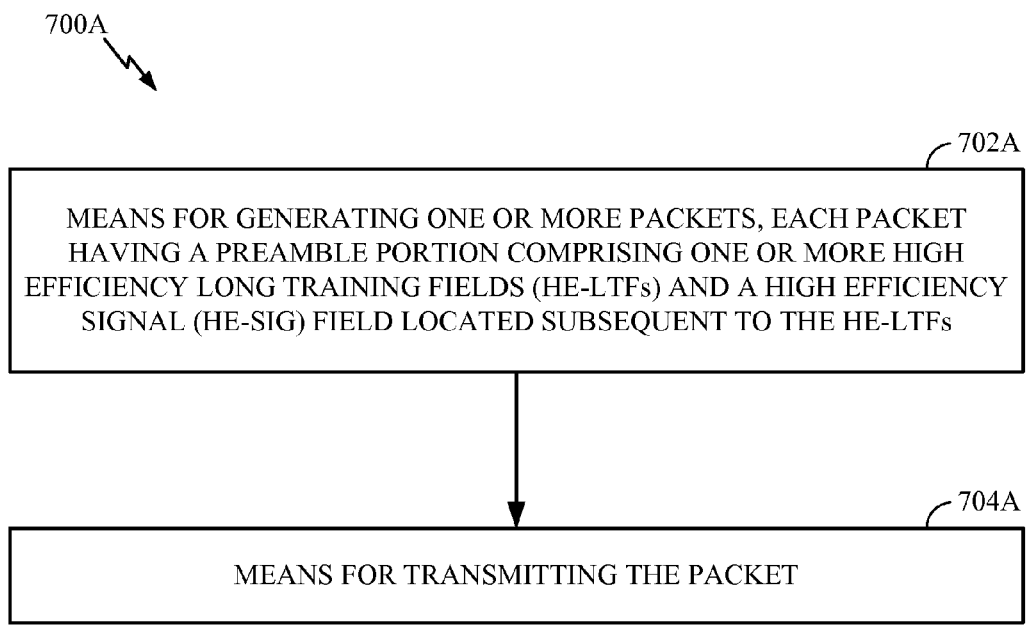
FIG. 7A illustrates example means capable of performing the operations shown in FIG. 7.

FIG. 7 is a flow diagram of example operations 700 for generating a packet, in accordance with certain aspects of the present disclosure. The operations 700 may be performed by an apparatus, such as a STA.

The operations 700 may begin, at 702, with the STA generating one or more packets (e.g., a HEW packet 150). Each packet has a preamble portion including one or more high efficiency long training fields (HE-LTFs) and a high efficiency signal (HE-SIG) field located subsequent to the HE-LTFs. For certain aspects, the preamble portion further includes a high efficiency short training field (HE-STF) preceding the one or more HE-LTFs. At 704, the STA may transmit the one or more packets. For certain aspects, each packet is transmitted as a UL MU-MIMO transmission.

According to certain aspects, the HE-SIG field is located after all the long training fields in each packet. The HE-SIG field may also be the only signal field in the preamble portion providing parameters for decoding a data portion of each packet. For certain aspects, at least one of the HE-SIG field or the one or more HE-LTFs complies with the IEEE 802.11 HEW amendment or later amendments to the IEEE 802.11 standard.

According to certain aspects, the preamble portion further comprises a legacy section preceding the one or more HE-LTFs. The legacy section may include a legacy short training field (L-STF), a legacy long training field (L-LTF) subsequent to the L-STF, and a legacy signal (L-SIG) field subsequent to the L-LTF. Each packet may include only two SIG fields: the L-SIG field and the HE-SIG field. For certain aspects, these two SIG fields are associated with only two symbols. For certain aspects, the operations 700 may further include the STA receiving a message indicating using a lengthened symbol duration. In this case, the generating at 702 may involve generating the one or more packets such that the L-LTF and the L-SIG field have a shorter symbol duration than the one or more HE-LTFs and the HE-SIG field. For certain aspects, the preamble portion also includes a high efficiency short training field (HE-STF) preceding the one or more HE-LTFs. The HE-STF may have a larger cyclic shift than that of the L-SIG field.

According to certain aspects, the preamble portion further includes one or more real symbols between the L-SIG field and the one or more HE-LTFs. As used herein, each real symbol has only a real component and no imaginary component (or at least no substantial imaginary component compared to the real component, such that this symbol will not lead to the packet being considered as an 802.11n packet when received). For certain aspects, the one or more real symbols are part of another HE-SIG field. In this case, the other HE-SIG field may include information regarding at least one of the packet being an uplink (UL) packet, a basic service set (BSS), or a clear channel assessment (CCA). The other HE-SIG field may have delay spread protection and, thus, may be composed of two or more real symbols. For certain aspects, the two or more real symbols in the other HE-SIG field are replicas of each other (e.g., multi-symbol HE-SIG0 field as illustrated in FIG. 3C). For certain aspects, each packet includes only three SIG fields: the L-SIG field, the HE-SIG field, and the other HE-SIG field. These three SIG fields may be associated with only four symbols.

According to certain aspects, each packet is associated with a set of one or more spatial streams. For certain aspects, the operations 700 further involve the STA receiving a message indicating a number of allocated spatial streams. In this case, transmitting the one or more packets may entail transmitting the one or more packets using fewer spatial streams than indicated by the number of allocated spatial streams. For certain aspects, a number of HE-LTFs in the preamble portion is based on a sum of the number of allocated spatial streams for each user, despite using fewer spatial streams (i.e., regardless whether the allocated number or a fewer number of spatial streams is used).

According to certain aspects, the HE-SIG field comprises at least one of an indication of a modulation and coding scheme (MCS), a number of spatial streams, an indication of space-time block coding (STBC), an indication of a coding rate, a cyclic redundancy check (CRC), a per-user length, or a tail portion. For certain aspects, no HE-SIG field precedes the one or more HE-LTFs in the preamble portion.

Figure 8:
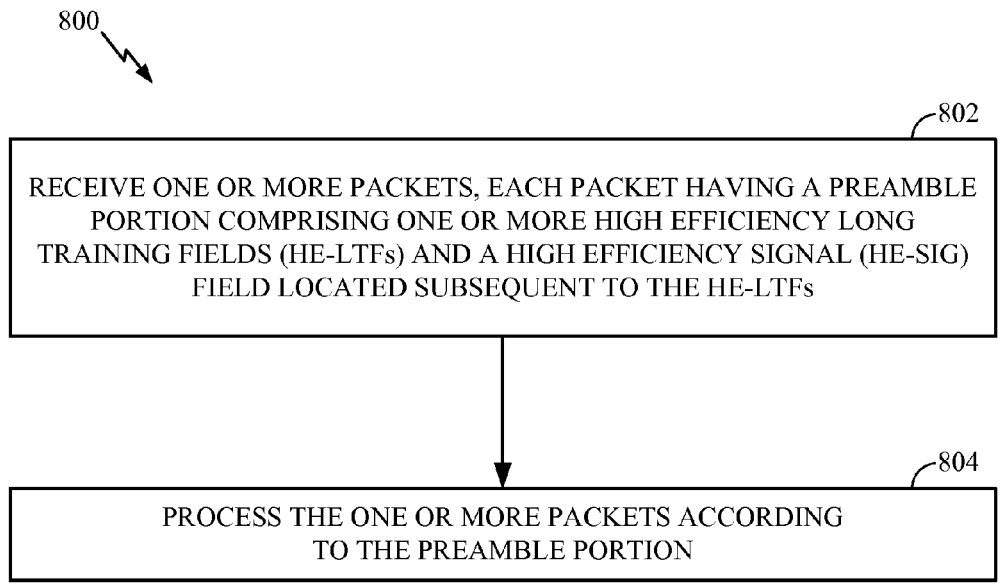
FIG. 8 is a flow diagram of example operations for processing one or more packets, each packet having a preamble portion comprising one or more HE-LTFs and an HE-SIG field, in accordance with certain aspects of the present disclosure.
Figure 8A:
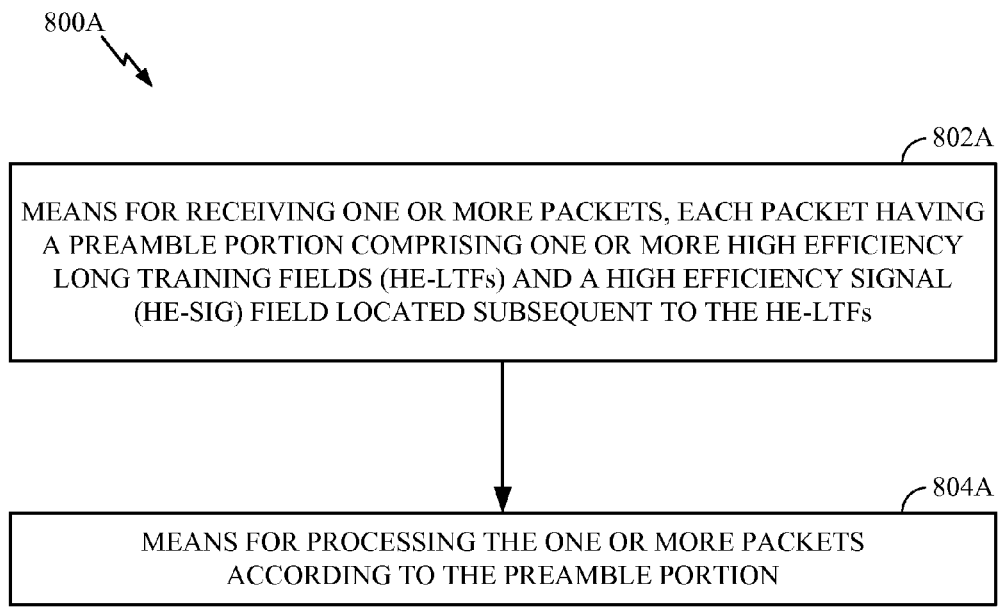
FIG. 8A illustrates example means capable of performing the operations shown in FIG. 8.

FIG. 8 is a flow diagram of example operations 800 for processing one or more packets, in accordance with certain aspects of the present disclosure. The operations 800 may be performed by an apparatus, such as an AP 110.

The operations 800 may begin, at 802, with the AP receiving one or more packets (e.g., a HEW packet 150). Each packet has a preamble portion, which generally includes one or more high efficiency long training fields (HE-LTFs) and a high efficiency signal (HE-SIG) field located subsequent to the HE-LTFs. For certain aspects, the preamble portion further includes a high efficiency short training field (HE-STF) preceding the one or more HE-LTFs.

At 804, the AP may process the one or more packets according to the preamble portion. For certain aspects, this processing may include estimating a channel for each of the one or more packets based on the one or more HE-LTFs, spatially separating out the HE-SIG field based on the estimated channel, and/or processing a data portion in each packet based on information in the HE-SIG field.

According to certain aspects, the HE-SIG field is located after all the long training fields in each packet. The HE-SIG field may be the only signal field in the preamble portion providing parameters for decoding a data portion of each packet. For certain aspects, at least one of the HE-SIG field or the one or more HE-LTFs complies with the IEEE 802.11 HEW amendment or later amendments to the IEEE 802.11 standard.

According to certain aspects, the preamble portion further comprises a legacy section preceding the one or more HE-LTFs. The legacy section may include a legacy short training field (L-STF), a legacy long training field (L-LTF) subsequent to the L-STF, and a legacy signal (L-SIG) field subsequent to the L-LTF. For certain aspects, each of the one or more packets has only two SIG fields: the L-SIG field and the HE-SIG field. These two SIG fields may be associated with only two symbols. For certain aspects, the operations 800 may further include the AP transmitting a message indicating use of a lengthened symbol duration, such that the L-LTF and the L-SIG field have a shorter symbol duration than the one or more HE-LTFs and the HE-SIG field in the one or more received packets. For certain aspects, the preamble portion also includes an HE-STF preceding the one or more HE-LTFs. In this case, the HE-STF may have a larger cyclic shift than that of the L-SIG field.

According to certain aspects, the preamble portion further includes one or more real symbols between the L-SIG field and the one or more HE-LTFs. As used herein, each real symbol has only a real component and no imaginary component (or at least no significant imaginary component as compared to the real component, such that this symbol will not lead to the received packet being considered as an 802.11n packet). For certain aspects, the one or more real symbols are part of another HE-SIG field. In this case, the other HE-SIG field may include information regarding at least one of the packet being an uplink (UL) packet, a basic service set (BSS), or a clear channel assessment (CCA). The other HE-SIG field may have delay spread protection and, thus, may be composed of two or more real symbols. For certain aspects, the two or more real symbols in the other HE-SIG field are replicas of each other. For certain aspects, each packet includes only three SIG fields: the L-SIG field, the HE-SIG field, and the other HE-SIG field. These three SIG fields may be associated with only four symbols.

According to certain aspects, each packet is associated with a set of one or more spatial streams and a different apparatus. For certain aspects, the operations 800 may further involve the AP transmitting a message indicating a number of spatial streams allocated for an apparatus (e.g., a STA). In this case, receiving the one or more packets at 802 entails receiving the one or more packets from the apparatus via fewer spatial streams than indicated by the number of allocated spatial streams. For certain aspects, a number of HE-LTFs in the preamble portion is based on a sum of the number of allocated spatial streams for each user, despite the fewer spatial streams used by the apparatus.

According to certain aspects, the HE-SIG field comprises at least one of an indication of a modulation and coding scheme (MCS), a number of spatial streams, an indication of space-time block coding (STBC), an indication of a coding rate, a cyclic redundancy check (CRC), a per-user length, or a tail portion. For certain aspects, no HE-SIG field precedes the one or more HE-LTFs in the preamble portion. For certain aspects, the HE-SIG field is a per-user field such that content of the HE-SIG field is the same for different packets received from the same apparatus.

Example Pilot Design

Pilots in Data Symbols

In UL MU-MIMO, the AP 110 may track a per-user phase/frequency offset during the data portion (e.g., a data portion 302). In this case, MIMO pilots may be used in UL MU-MIMO.

For certain aspects, the AP 110 can use a minimum mean square error (MMSE) filter to track per-user phase offset in each data symbol.

$$\begin{bmatrix} y_1 \\ \vdots \\ y_K \end{bmatrix} = H * \begin{bmatrix} e^{j\varphi_1} \\ \vdots \\ e^{j\varphi_N} \end{bmatrix} + \begin{bmatrix} w_1 \\ \vdots \\ w_K \end{bmatrix}$$

Here N is the number of users in the UL transmission, and K=Num_pilots*Nrx. Note that the AP can use an N-dimensional inverse to estimate the phase offsets and that the transmit pilot value has been absorbed into the H matrix above. Correction may be performed in the per-user domain after spatial filtering.

Pilots in HEW-LTFs

If tone-interleaved LTFs are used in UL MU-MIMO, then each subcarrier carries an LTF sample from only one user. Hence, pilots need not be included in the LTF symbols. In other words, there is no cross-stream leakage in channel estimates as is the case with P-matrix-based LTFs (in IEEE 802.11ac, for example, pilots in the LTFs solve that problem).

Figure 9:
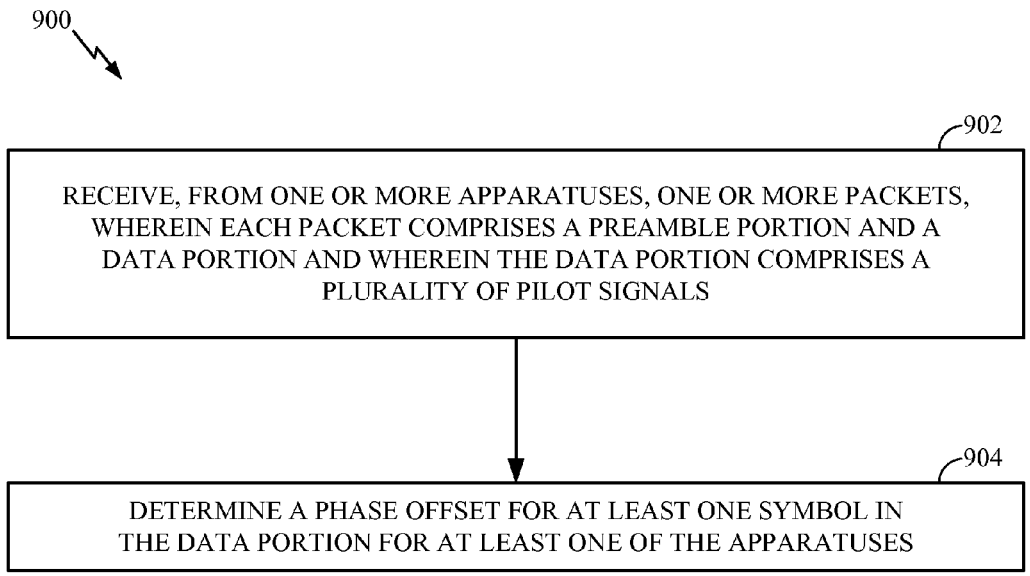
FIG. 9 is a flow diagram of example operations for determining a phase offset based on a plurality of pilot signals, in accordance with certain aspects of the present disclosure.
Figure 9A:
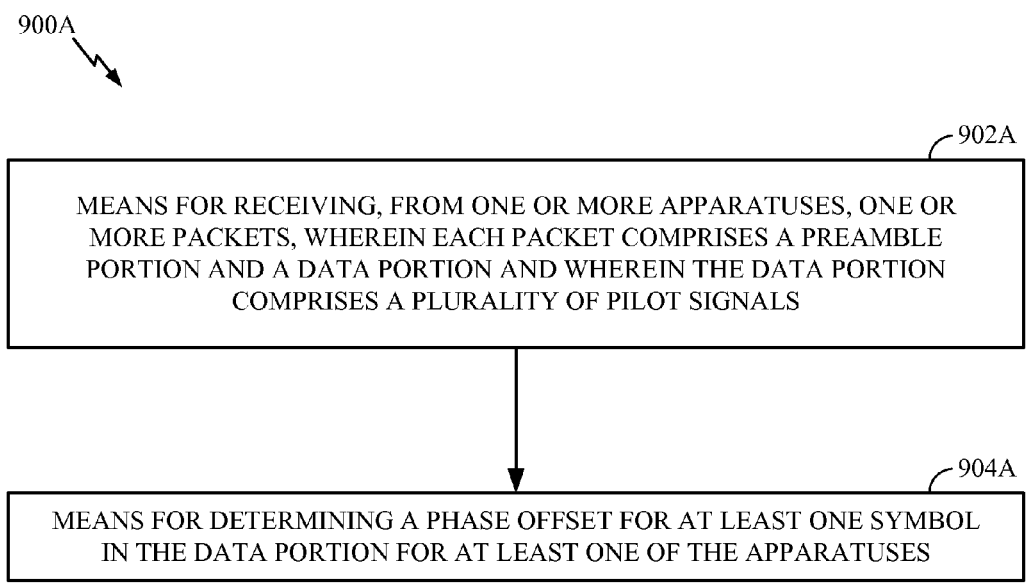
FIG. 9A illustrates example means capable of performing the operations shown in FIG. 9.

FIG. 9 is a flow diagram of example operations 900 for determining a phase offset based on a plurality of pilot signals, in accordance with certain aspects of the present disclosure. The operations 900 may be performed by an apparatus, such as an AP 110.

The operations 900 may begin, at 902, with the AP receiving, from one or more apparatuses, one or more packets (e.g., a HEW packet 150). Each packet includes a preamble portion and a data portion (e.g., data portion 302), and the data portion includes a plurality of pilot signals. For certain aspects, the one or more packets comprise one or more UL MU-MIMO packets. For certain aspects, the preamble portion includes one or more long training fields (LTFs) (e.g., L-LTF 306 and/or HE-LTFs 310), where the one or more LTFs include no pilot signals.

At 904, the AP may determine a phase offset for at least one symbol in the data portion for at least one of the apparatuses, based on the plurality of pilot signals. For certain aspects, determining the phase offset at 904 involves using spatial filtering. The spatial filtering may include minimum mean square error (MMSE) filtering, for example. According to certain aspects, determining the phase offset involves using an N-dimensional inverse based on an equation $$\begin{bmatrix} y_1 \\ \vdots \\ y_K \end{bmatrix} = H * \begin{bmatrix} e^{j\varphi_1} \\ \vdots \\ e^{j\varphi_N} \end{bmatrix} + \begin{bmatrix} w_1 \\ \vdots \\ w_K \end{bmatrix}$$

where N is a number of the one or more apparatuses, K equals a number of pilot signals multiplied with a number of receive antennas, H is a channel matrix, φ is the phase offset, and w represents noise.

According to certain aspects, the operations 900 may further involve the AP compensating the at least one symbol in the data portion for the at least one of the apparatuses based on the determined phase offset for the at least one symbol.

Solving Residual Frequency Errors on LTF

STAs may perform correction on their UL transmissions (e.g., of HEW packets 150) by applying a phase ramp in the time domain. However, there may still be some residual frequency error.

This residual frequency error during channel training has the following effects: (1) inter-carrier interference (ICI) and (2) loss of orthogonality of Walsh encoding (P matrix) on the LTFs. ICI is a minor effect as long as frequency errors are <1% of subcarrier spacing. The loss of orthogonality of the Walsh encoding (P matrix) on the LTFs is a significant effect that becomes larger the longer the training period. Currently, there is no easy way to estimate and correct different frequency offsets from a Walsh encoded channel training.

Certain aspects of the present disclosure provide at least three different ways to solve this residual frequency offset problem: (1) using two spaced-apart symbols; (2) using tone-interleaved LTFs; and (3) using subband-based LTFs.

For the first solution, the frequency estimation performed by a STA is made more accurate by using 2 symbols (with known data) far apart in time (farther than the one OFDM symbol gap (e.g., a guard interval) used in traditional fine frequency estimation in LTF) to carry out the estimation. More distance in time provides more resolution. For certain aspects, the STA can use the LTF in a DL packet and a "correctly decoded SIG as pilot" or another LTF inserted at the end of clear to switch (CTX). The desired STA frequency offset accuracy (relative to the AP) in order to avoid specific processing at the AP is 600 Hz RMS error for 4 VHT-LTFs or 250 Hz for 8 VHT-LTFs.

The second solution to the residual frequency offset problem involves letting the STAs correct the frequency offset with traditional frequency correction algorithms, but allowing the AP to conduct further correction through tone-interleaved LTFs. For tone-interleaved LTFs, spatial stream i may transmit tones $(i+kN_{ss})\% N$, where N is the total number of tones and $k=\{0, 1, \ldots N/N_{ss}\}$. The STA may transmit $N_{ss}+1$ VHT-LTF (or HE-LTF) symbols where the last symbol is a copy of the first symbol. Then, the AP may use phase differences for $N_{ss}$ tone subsets between the first and last VHT-LTF (or HE-LTF) symbols to estimate and correct for frequency drift across all VHT-LTF (or HE-LTF) symbols. In FIGS. 10-13, for example, the contents in the last LTF symbol are a copy of the contents in the first LTF symbol at each tone (or each subband as in FIG. 13), and hence, both the first and last LTF symbols are labeled "LTF1" to indicate this replication.

Figure 10:
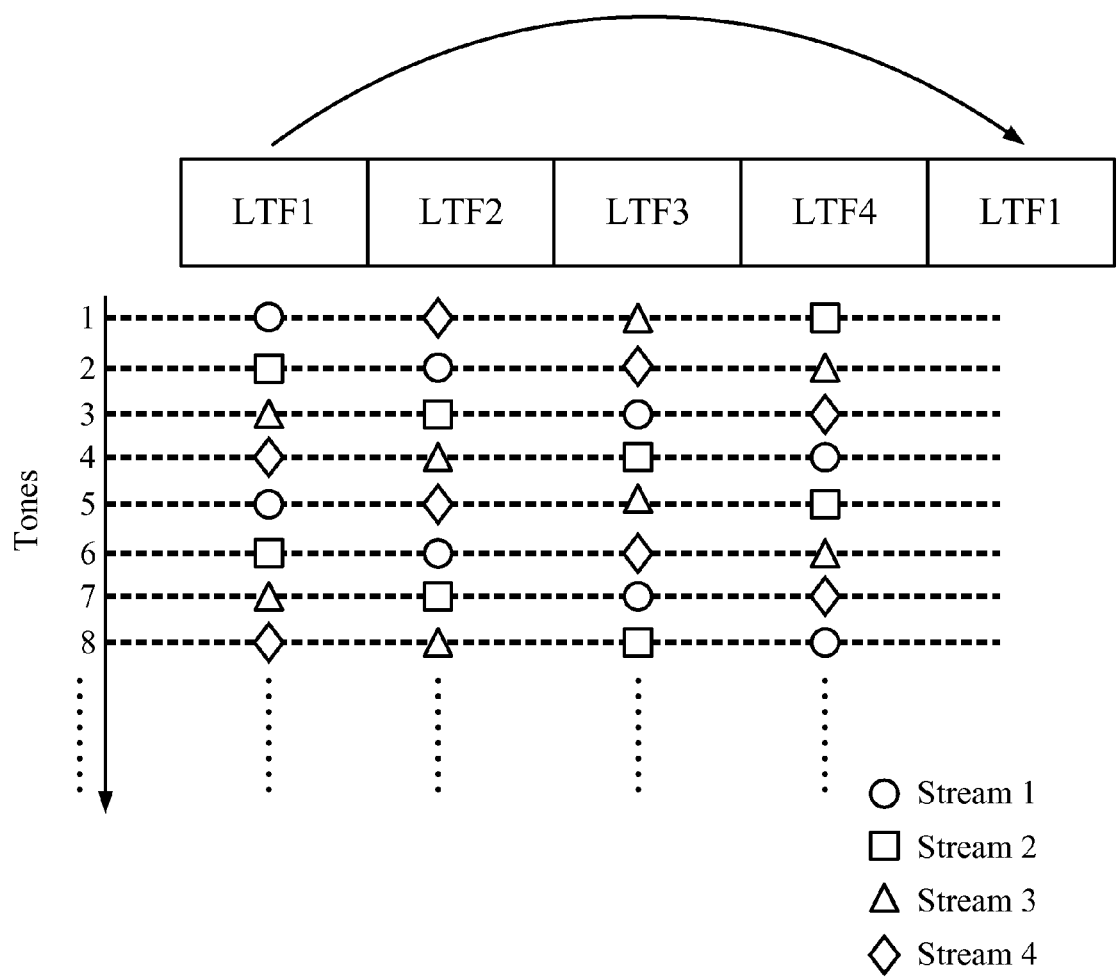
FIG. 10 illustrates an example of tone-interleaved LTFs for four spatial streams where the tone shift between two consecutive LTFs is +1, in accordance with certain aspects of the present disclosure.

FIG. 10 illustrates an example of tone-interleaved LTFs where there are four spatial streams total. Here, the tone shift for each spatial stream between two consecutive LTFs is +1. As an example of this +1 tone shift, spatial stream 1 shifts from tone 1 in LTF1 to tone 2 in LTF2 (a tonal difference of +1). Likewise, spatial stream 4 shifts from tone 1 in LTF2 to tone 2 in LTF3, and spatial stream 2 shifts from tone 2 in LTF1 to tone 3 in LTF2 (all tonal differences of +1 between any two consecutive LTFs). Since spatial streams do not step on each other in frequency, cross-stream leakage is not an issue with a few kHz offset. Also, per-stream frequency offset may be estimated by repeating LTF1 at the end, as shown.

In this case, a more precise equation (compared to the one listed above) may be used instead. Spatial stream i transmits on tone indices given by the formula below during the LTF j, where N is the total number of tones (excluding guard and DC), $j=\{1, 2, \ldots N_{ss}\}$, $k=\{0, 1, \ldots \text{floor}(N/N_{ss})\}$, and $N_{ss}$ is the total number of streams:

$$\text{Tone\_indices}^k(i,j)=(i+(j-1)+kN_{ss})\% N$$

The former version of the equation described the locations of a stream's indices only in the first LTF symbol. Addition of LTF index j in the latter equation describes the movement seen in FIG. 10, for example, from one LTF symbol to the next. In case $N/N_{ss}$ is not an integer, j may span the range $\{1, 2, \ldots, N_{ss}+1\}$.

Figure 11:
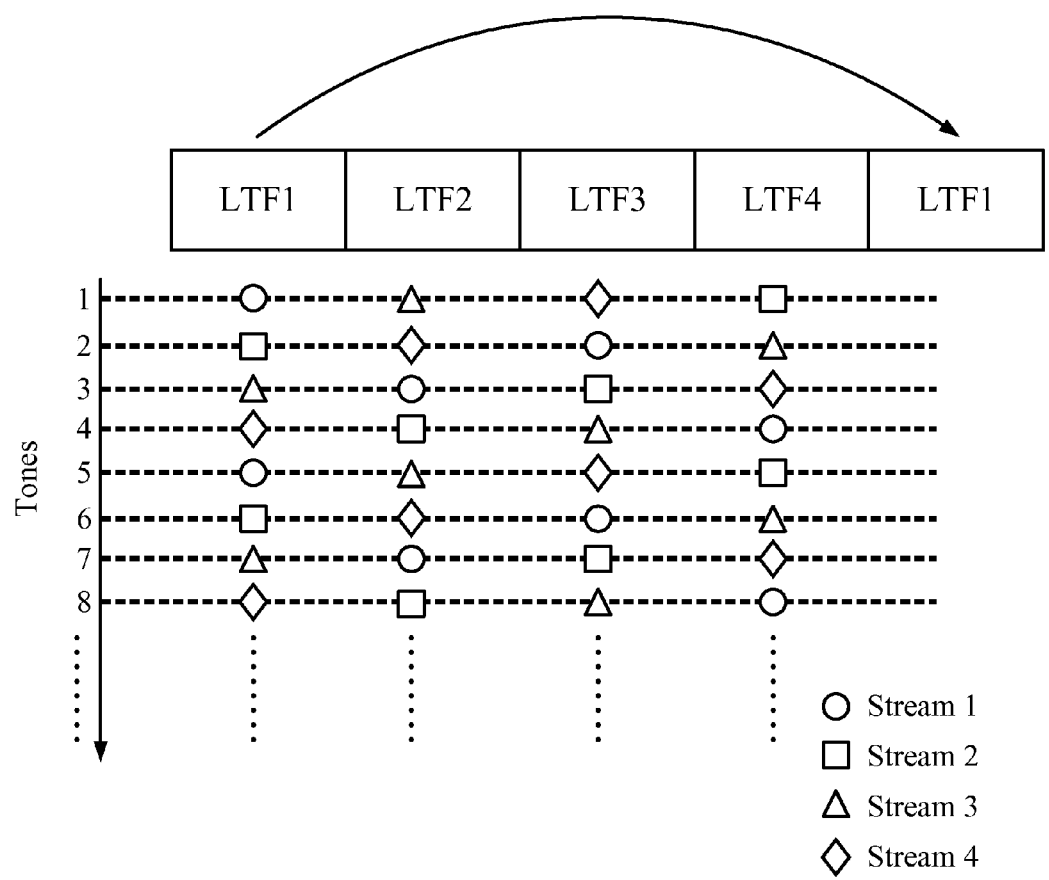
FIG. 11 illustrates an example of tone-interleaved LTFs for four spatial streams where the tone shift between two consecutive LTFs is different than +1, in accordance with certain aspects of the present disclosure.

For certain aspects, the shift in tone indices of a spatial stream from one LTF symbol to the next may happen in a different way from that illustrated in FIG. 10. In other words, the tone shift between one stream's indices on two consecutive LTFs may not be +1. FIG. 11 illustrates an example of tone-interleaved LTFs for four spatial streams where the tone shift between two consecutive LTFs is different than +1, in accordance with certain aspects of the present disclosure. In FIG. 11 for each spatial stream, the tone shift between LTF1 and LTF2 is +2, the tone shift between LTF2 and LTF3 is −1, and the tone shift between LTF3 and LTF4 is +2.

Figure 12:
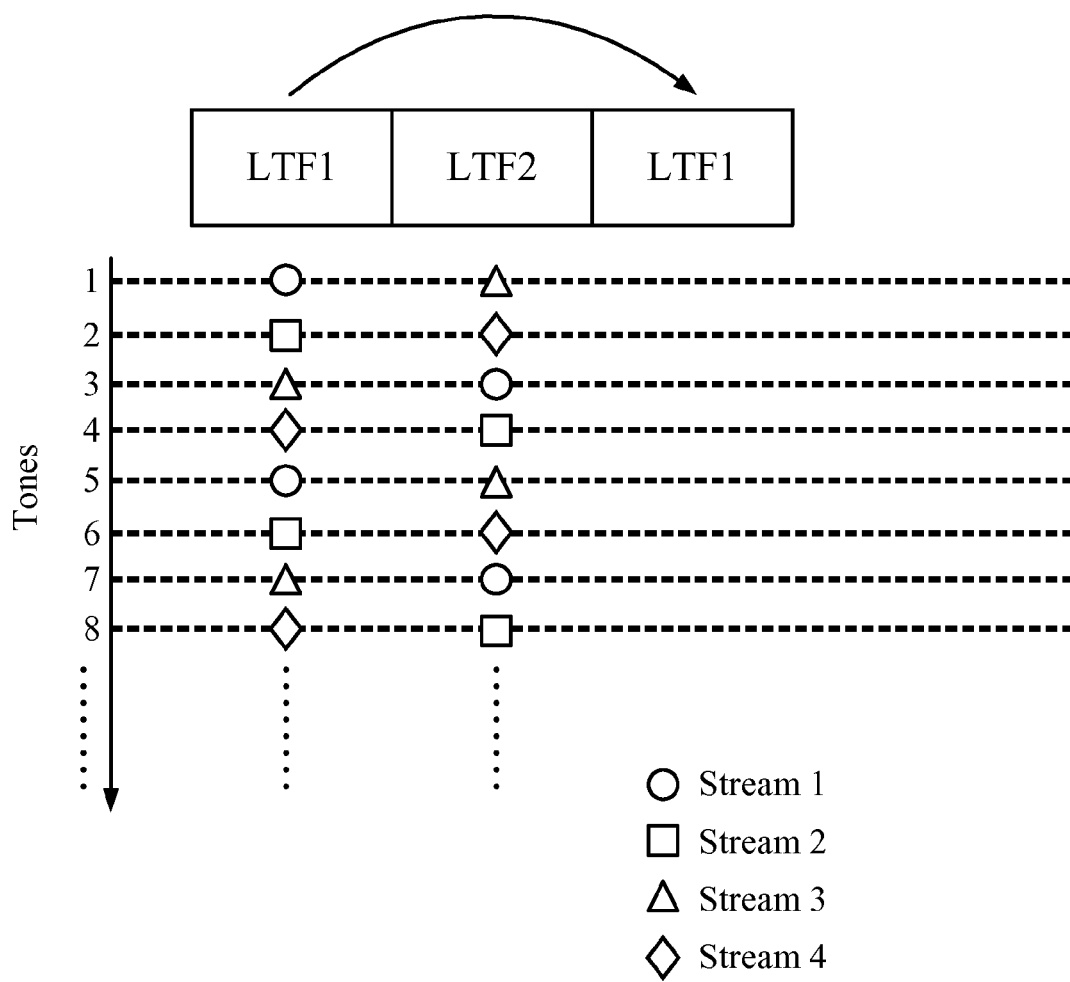
FIG. 12 illustrates an example of tone-interleaved LTFs for four spatial streams where each spatial stream covers only half of the tones, in accordance with certain aspects of the present disclosure.

Also, as a sub-option in the case where there is a shift by 2 or 4 tones for each stream, a reduction of LTF overhead may be achieved by only covering half or a quarter of the tones for each stream. This may implicate performing interpolation since channels are only available for a sub-sampled set of the total tones. FIG. 12 illustrates an example of tone-interleaved LTFs for four spatial streams where each spatial stream covers only half of the tones, in accordance with certain aspects of the present disclosure. In FIG. 12 for each spatial stream, the tone shift is +2 between LTF1 and LTF2.

According to certain aspects, the LTFs may be sent using subband allocation (which may include subband interleaving) for a number of subcarriers. For example, one subband (a range of tones, where tones are also referred to as subcarriers) may be used for one spatial stream in every LTF symbol, and the subband allocation for a given spatial stream shifts from one LTF symbol to the next. The number of subcarriers ($N_{sc}$) for subband allocation may represent all available subcarriers or a subset thereof. For certain aspects, multiple subbands may be used for a given spatial stream in every LTF symbol. For a given spatial stream, shifting of subbands between consecutive LTF symbols may occur as described above for tone shifting (e.g., with the same or different subband shifts between consecutive LTFs, where the subband shifts may be positive or negative).

Figure 13:
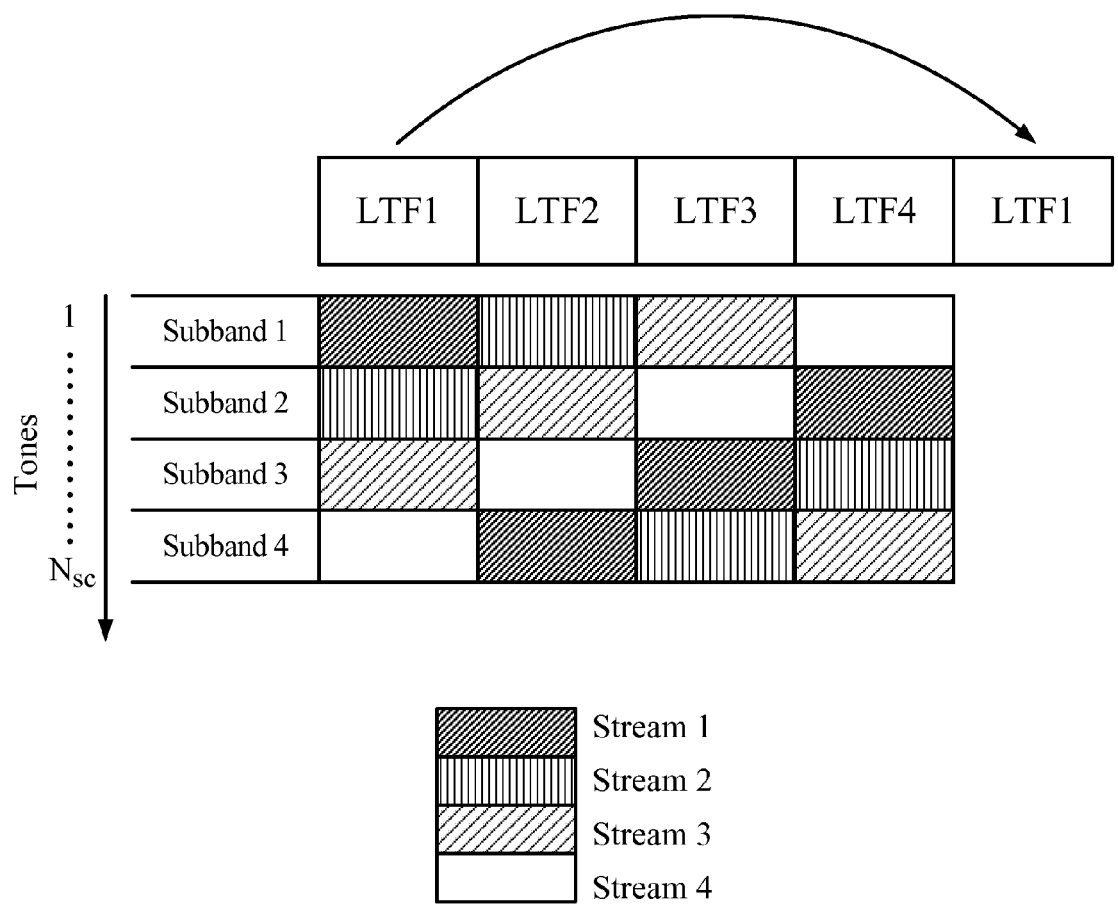
FIG. 13 illustrates an example of subband-based LTFs for four spatial streams, in accordance with certain aspects of the present disclosure.

FIG. 13 illustrates an example of subband-based LTFs for four spatial streams, in accordance with certain aspects of the present disclosure. In LTF1, subband 1 is allocated for spatial stream 1, subband 2 is allocated for spatial stream 2, subband 3 is allocated for spatial stream 3, and subband 4 is allocated for spatial stream 4. In FIG. 13 for each spatial stream, the subband shift between LTF1 and LTF2 is −1, such that in LTF2, subband 1 is allocated for spatial stream 2, subband 2 is allocated for spatial stream 3, subband 3 is allocated for spatial stream 4, and subband 4 is allocated for spatial stream 1.

Figure 14:
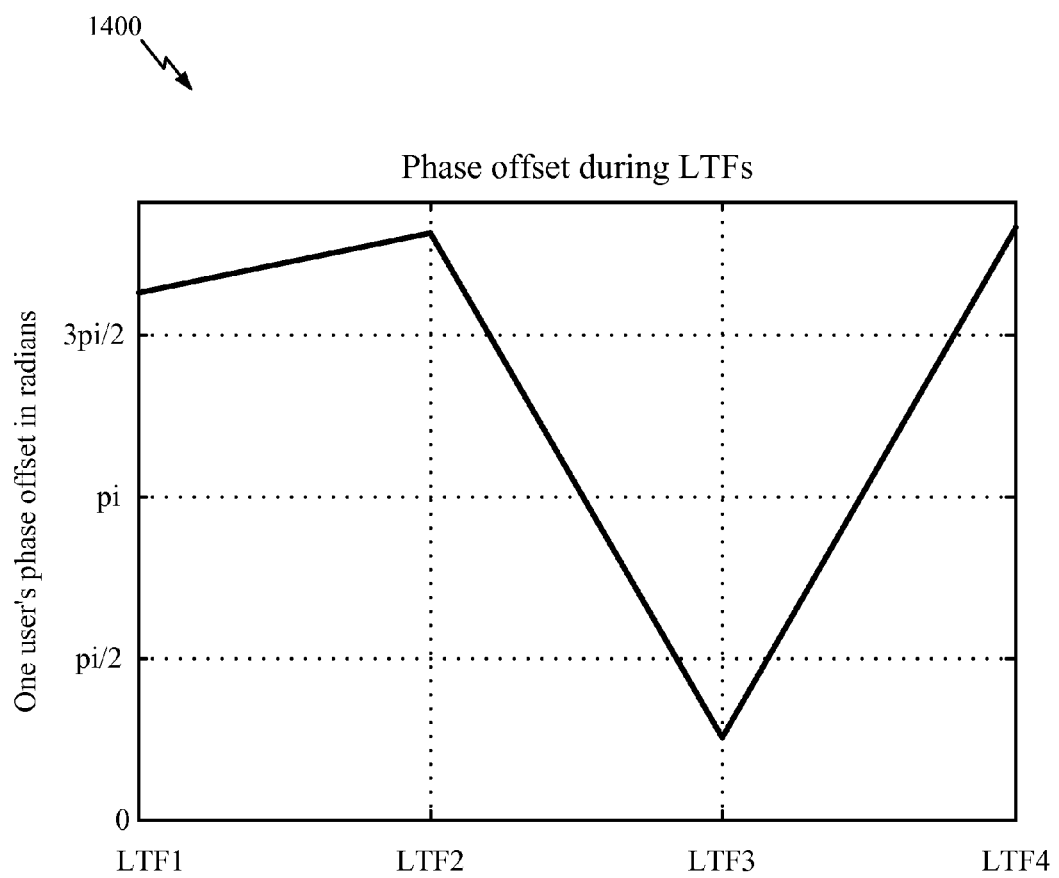
FIG. 14 is a graph illustrating one user's example phase offset for different LTFs, in accordance with certain aspects of the present disclosure.

As illustrated in the graph 1400 of FIG. 14, there may be a problem with the design of tone-interleaved LTFs described above. Namely, the phase roll due to frequency offset during the LTF section may be nonlinear across symbols. This may be due to jitter in the settling error. Therefore, an LTF symbol which is a direct repeat of the first LTF may not be enough to estimate the per-user, per-LTF phase. Correcting the phase offset based on an LTF which is a copy of the first LTF may lead to tone-set dependent residual phase errors in the channel estimate. These tone-set dependent errors cannot be corrected by the phase tracking loop (during the data section), which tracks the common phase error (across all tones) per user.

Figure 15:
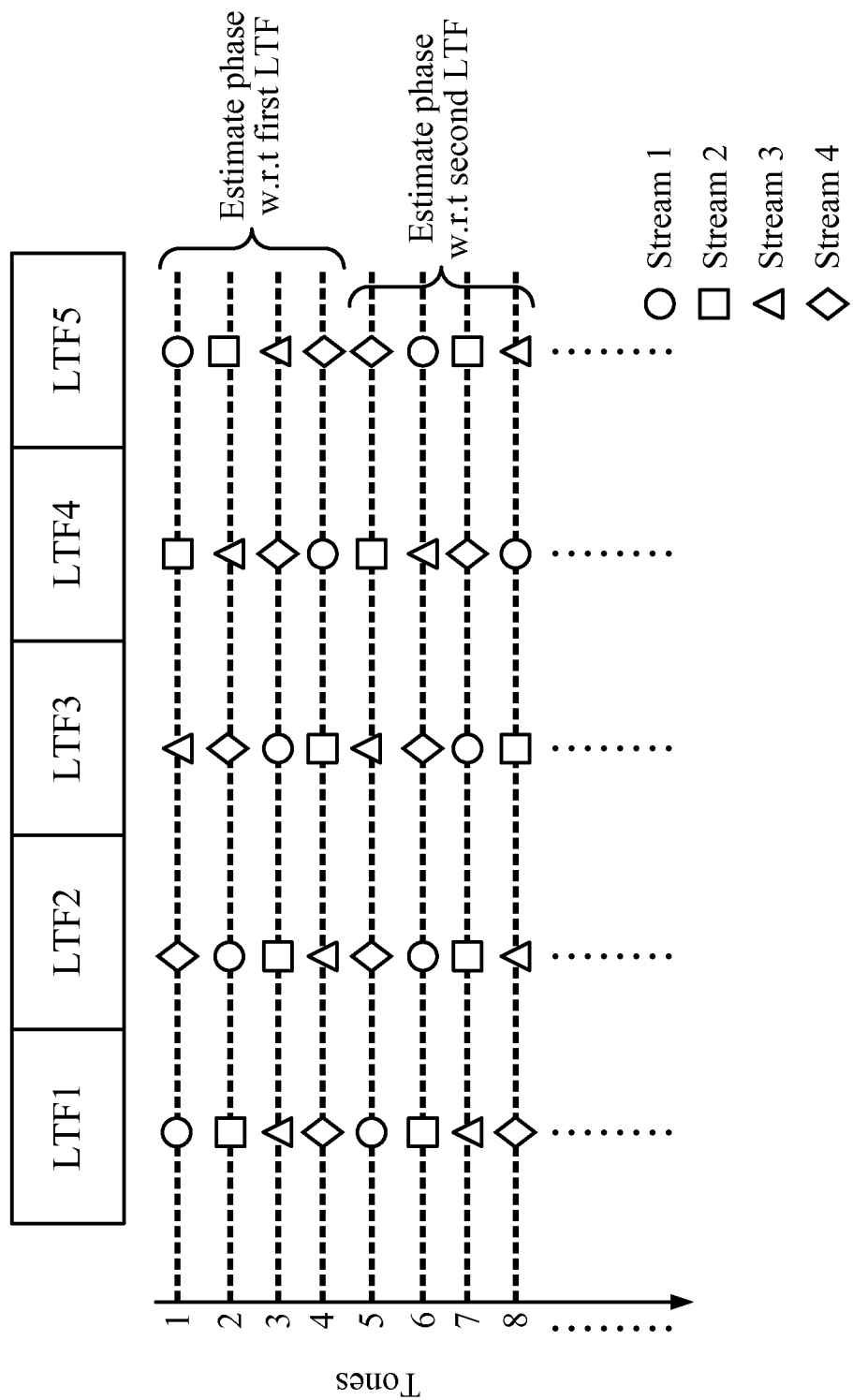
FIG. 15 illustrates an example of tone-interleaved LTFs for four spatial streams where the last LTF is a copy of different portions of the previous LTFs according to a pattern, in an effort to enable per-user, per-LTF phase tracking, in accordance with certain aspects of the present disclosure.

Accordingly, certain aspects of the present disclosure provide an approach to enable per-user, per-LTF phase tracking. FIG. 15 illustrates tone-interleaved LTFs with per-user, per-LTF phase tracking, in accordance with certain aspects of the present disclosure. This approach is basically the same as the tone-interleaved LTFs described above (e.g., with respect to FIGS. 10 and 11). However, the last LTF (LTF5 in FIG. 15) is a mixture of the first four LTFs (instead of repeating LTF1 as before). In this manner, per-user, per-LTF phase tracking is enabled to solve the phase offset per-LTF problem depicted in FIG. 14.

Note that LTF1 may be repeated at the end in the tone-interleaved approach (e.g., FIG. 10) and the subband-based approach (e.g., FIG. 13), as described above. According to certain aspects, an alternative idea involves distributing the repetition across the entire LTF section to enable phase tracking, rather than repeating in an extra LTF at the end. For example, LTF2 may have some tones equal to LTF1, LTF3 may have some (other) tones equal to LTF2, LTF4 may have some (other) tones equal to LTF3, LTF5 may have some (other) tones equal to LTF4, and LTF1 may have some (other) tones equal to LTF5.

Hybrid LTF Approach

As described above, UL MU-MIMO LTFs typically entail channel knowledge for the entire bandwidth on all spatial streams. Two fundamental ways in which the spatial streams can be made to visit all the tones (i.e., subcarriers) include tone-interleaved LTFs (where the streams are assigned to interleaved subsets of tones, as in FIG. 10, for example) and subband-based LTFs (where the streams are assigned contiguous subsets of tones, as in FIG. 13, for example). Note that a repeat of the first LTF1 at the end need not be included in tone-interleaved LTFs, because a STA can interpolate the channel on each LTF (per stream) to track the phase offset.

Subband-based and tone-interleaved approaches to LTF design may be compared, for example, with respect to leakage from other STAs, possibility of channel interpolation to obtain phase offset, power spectral density (PSD), OFDMA unification, and coexistence with other radio access technologies (RATs). The subband-based approach may have less leakage because only edge tones may suffer from leakage due to another STA. The leakage issue may be equally bad on all tones in the tone-interleaved approach. Performing channel interpolation to obtain phase offset may not be possible with the subband-based approach, but works well with 4× symbol durations in the tone-interleaved approach. The subband-based approach is more compatible with subband-based OFDMA than the tone-interleaved approach, which loses the frequency selective scheduling gain. However, the subband-based approach is less compatible with tone-interleaved OFDMA than the tone-interleaved approach, in which it is easier to achieve sufficient diversity. In contrast, the subband-based approach may lose diversity (random subband compared to interleaved). With the subband-based approach, it may be easier for other technologies to grab the wireless medium. In contrast, because the entire band is occupied with the tone-interleaved approach, the medium is expected to be clearer.

Based on the above comparisons, it seems that both LTF design approaches have certain advantages. Accordingly, it may be desirable to combine features of the two approaches in a hybrid approach to LTF design.

FIG. 16 illustrates an example hybrid approach to LTF design for four spatial streams, mixing subband-based and tone-interleaved approaches, in accordance with certain aspects of the present disclosure. In FIG. 16, the number of subcarriers ($N_{sc}$) has been divided into two subbands, Subband 1 and Subband 2. For LTF1, spatial streams 1 and 2 are tone-interleaved within Subband 1, and spatial streams 3 and 4 are tone-interleaved within Subband 2. Thus, spatial stream 1 may be associated with odd tones in Subband 1, while spatial stream 2 may be associated with even tones in Subband 1, or vice versa. For LTF2, spatial streams 3 and 4 are tone-interleaved within Subband 1, and spatial streams 1 and 2 are tone-interleaved within Subband 2. For LTF3, spatial streams 2 and 1 are tone-interleaved within Subband 1, and spatial streams 4 and 3 are tone-interleaved within Subband 2. Thus, spatial stream 2 may be associated with odd tones in Subband 1, while spatial stream 1 may be associated with even tones in Subband 1 (or vice versa), different than the tone-interleaving in LTF1. For LTF4, spatial streams 4 and 3 are tone-interleaved within Subband 1, and spatial streams 2 and 1 are tone-interleaved within Subband 2.

This hybrid approach may be expanded to higher numbers of subbands. For example, four subbands may be used, where the approach presented in FIG. 16 is repeated for Subbands 3 and 4 for the case of four spatial streams. For other aspects, eight spatial streams may be used. In this case for LTF1, spatial streams 5 and 6 may be tone-interleaved within Subband 3, and spatial streams 7 and 8 may be tone-interleaved within Subband 4, for example. A similar pattern to that shown in FIG. 16 may be carried throughout the LTFs in Subbands 3 and 4 for spatial streams 5, 6, 7, and 8 (substituting for streams 1, 2, 3, and 4).

Furthermore, more than two spatial streams may be tone-interleaved in an LTF for each subband. For example, four spatial streams may be tone-interleaved in LTF1 for Subband 1.

This hybrid approach offers several advantages, which represent the best of the tone-interleaved and subband-based approaches. For example, interpolation for phase tracking is possible. In fact, for a large number of streams, the hybrid approach is expected to perform better than tone-interleaved LTFs where the interpolation occurs based on tones which are far apart (e.g., up to 8 tones apart). In addition, some frequency selective scheduling is also possible if the hybrid approach is unified with OFDMA. Power density in the hybrid approach is not as bad as the subband-based approach of FIG. 13. The hybrid approach provides better transmission protection (from other RATs) than the subband-based design. Furthermore, the leakage issue is not as bad as the tone-interleaved approach if users with similar power levels are scheduled together. However, one disadvantage of the hybrid approach is that for an odd number of streams, the hybrid approach involves one more LTF than the tone-interleaved-without-repeating-the-first-LTF approach.

Figure 17:
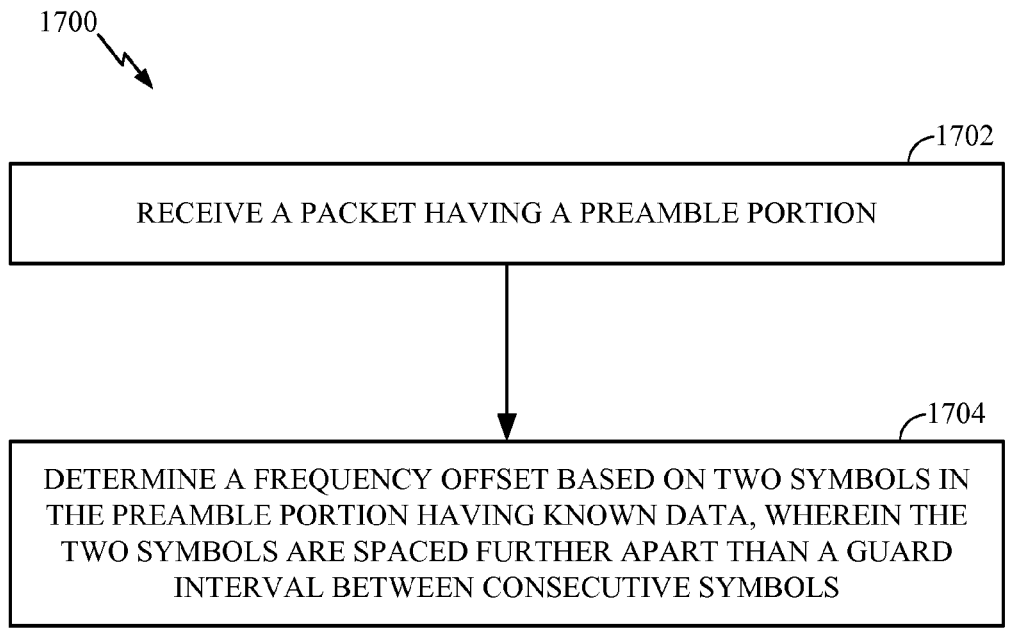
FIG. 17 is a flow diagram of example operations for determining a frequency offset based on two symbols spaced further apart than a guard interval between consecutive symbols, in accordance with certain aspects of the present disclosure.
Figure 17A:
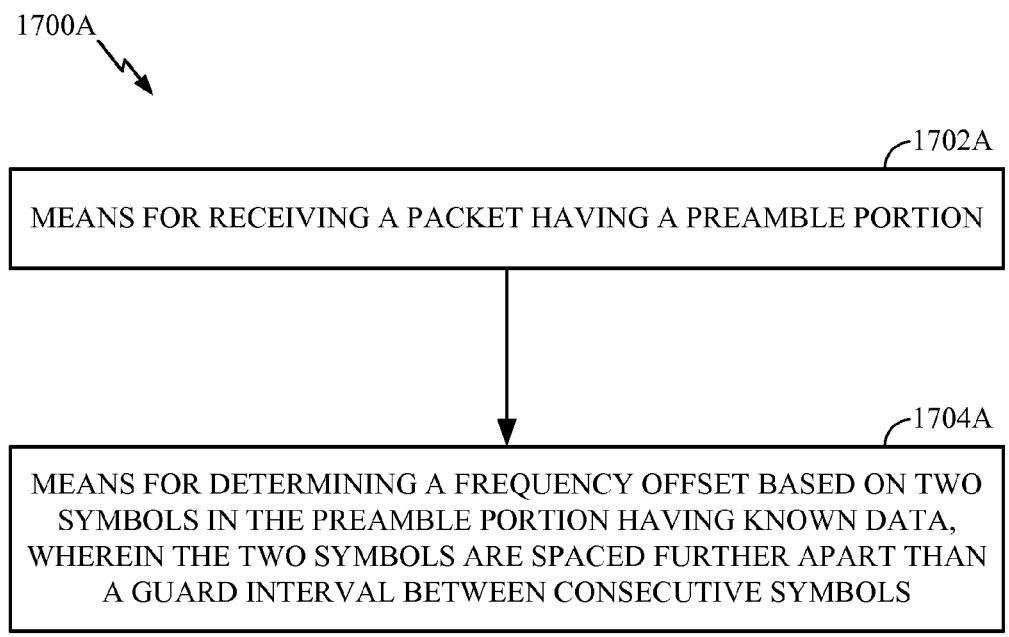
FIG. 17A illustrates example means capable of performing the operations shown in FIG. 17.

FIG. 17 is a flow diagram of example operations 1700 for determining a frequency offset, in accordance with certain aspects of the present disclosure. The operations 1700 may be performed by an apparatus, such as a STA.

The operations 1700 may begin, at 1702, with the STA receiving a packet having a preamble portion. At 1704, the STA may determine a frequency offset based on two symbols in the preamble portion having known data. The two symbols are spaced further apart than a guard interval (e.g., 800 ns) between consecutive symbols.

For certain aspects, the two symbols are associated with an LTF and with a SIG field. For other aspects, the two symbols are associated with non-consecutive LTFs.

According to certain aspects, the operations 1700 may further include the STA transmitting another packet based on the frequency offset. For certain aspects, the other packet is a UL MU-MIMO packet.

Figure 18:
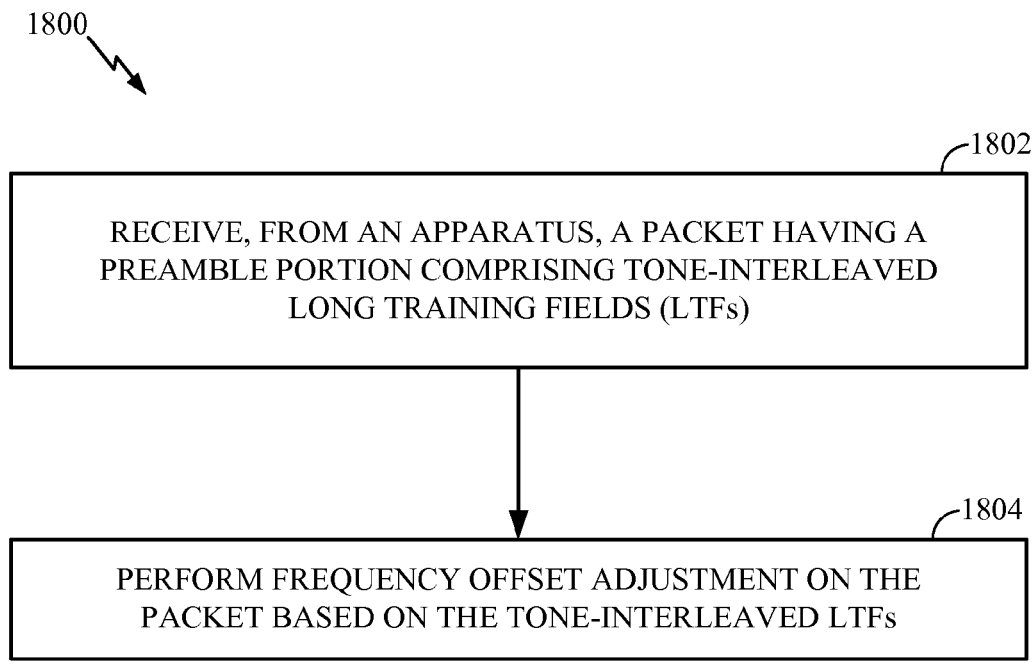
FIG. 18 is a flow diagram of example operations for performing frequency offset adjustment based on tone-interleaved LTFs, in accordance with certain aspects of the present disclosure.
Figure 18A:
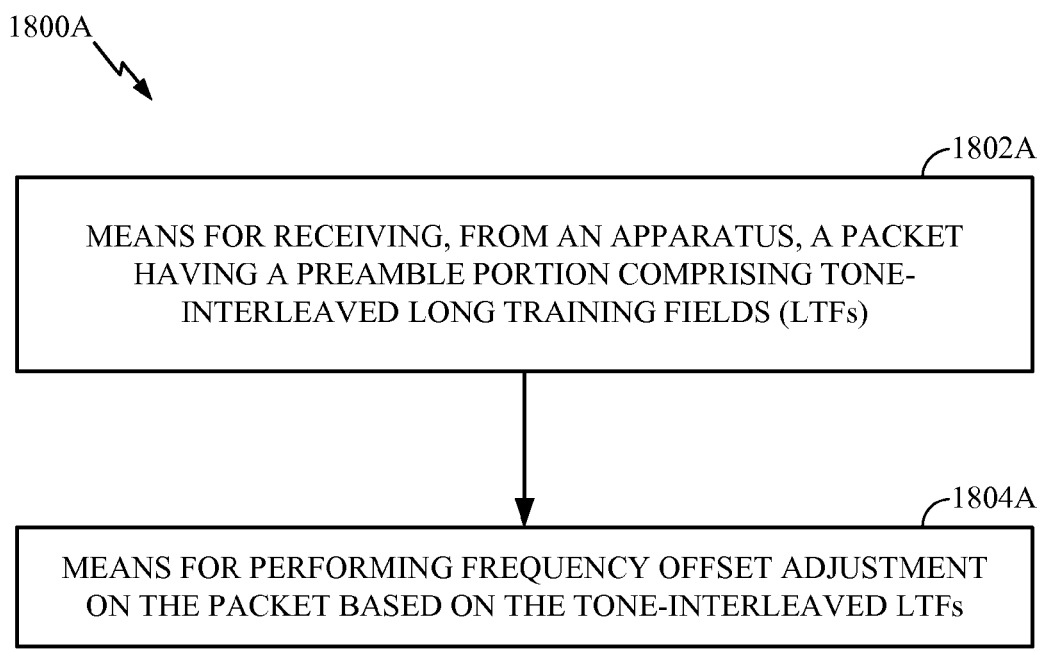
FIG. 18A illustrates example means capable of performing the operations shown in FIG. 18.

FIG. 18 is a flow diagram of example operations 1800 for performing frequency offset adjustment based on tone-interleaved LTFs, in accordance with certain aspects of the present disclosure. The operations 1800 may be performed by an apparatus, such as an AP 110.

The operations 1800 may begin, at 1802, with the AP receiving, from another apparatus (e.g., a STA), a packet (e.g., a HEW packet 150 as depicted in FIGS. 1 and 2) having a preamble portion comprising tone-interleaved long training fields (LTFs). In each tone-interleaved LTF, a first spatial stream is associated with a first subset of tones (in a transmission bandwidth) and a second spatial stream is associated with a second subset of the tones interleaved with the first subset of the tones. At 1804, the AP may perform frequency offset adjustment on the packet based on the tone-interleaved LTFs.

According to certain aspects, a number of the LTFs is one more than a number of spatial streams transmitted by the other apparatus. For certain aspects, a last one of the tone-interleaved LTFs is a copy of the first one of the tone-interleaved LTFs. For certain aspects, performing the frequency offset adjustment at 1804 involves using phase differences for a number of tone subsets between the first and the last ones of the tone-interleaved LTFs to determine a frequency offset, wherein the number of the tone subsets equals the number of spatial streams.

According to certain aspects, each of the tone-interleaved LTFs includes interleaved tones designated for each spatial stream of each user in a UL MU-MIMO transmission. For certain aspects, a pattern of the interleaved tones designated for each spatial stream of each user is shifted between two consecutive tone-interleaved LTFs. For certain aspects, the pattern of the interleaved tones is shifted by one tone or something other than one tone. For example, the pattern of the interleaved tones may be shifted by 2 or by 4 tones. In this case, each spatial stream may cover one half or one quarter, respectively, of all tones for the tone-interleaved LTFs. Consequently, the operations 1800 may further include interpolating missing tones before performing the frequency offset adjustment at 1804.

According to certain aspects, a last one of the tone-interleaved LTFs is a copy of different portions of one or more prior LTFs of the tone-interleaved LTFs, according to a pattern. In this case, performing the frequency offset adjustment involves correcting phase differences for a number of tone subsets between the different portions of the one or more prior LTFs and the last one of the tone-interleaved LTFs, according to the pattern. For certain aspects, using the phase differences entails determining a phase offset for each of the prior LTFs for each of the spatial streams. For certain aspects, the operations 1800 further include extracting information in a signal (SIG) field (e.g., an HE-SIG field) embedded in the last one of the tone-interleaved LTFs and processing the packet based on the information in the SIG field. This extracting may include detecting polarity changes on tones in the last one of the tone-interleaved LTFs.

According to certain aspects, in each tone-interleaved LTF, the first and second subsets of the tones are associated with a first set of one or more subbands, a third spatial stream is associated with a third subset of tones, a fourth spatial stream is associated with a fourth subset of tones interleaved with the third subset of the tones, and the third and fourth subsets of tones are associated with a second set of one or more subbands different than the first set.

Figure 19:
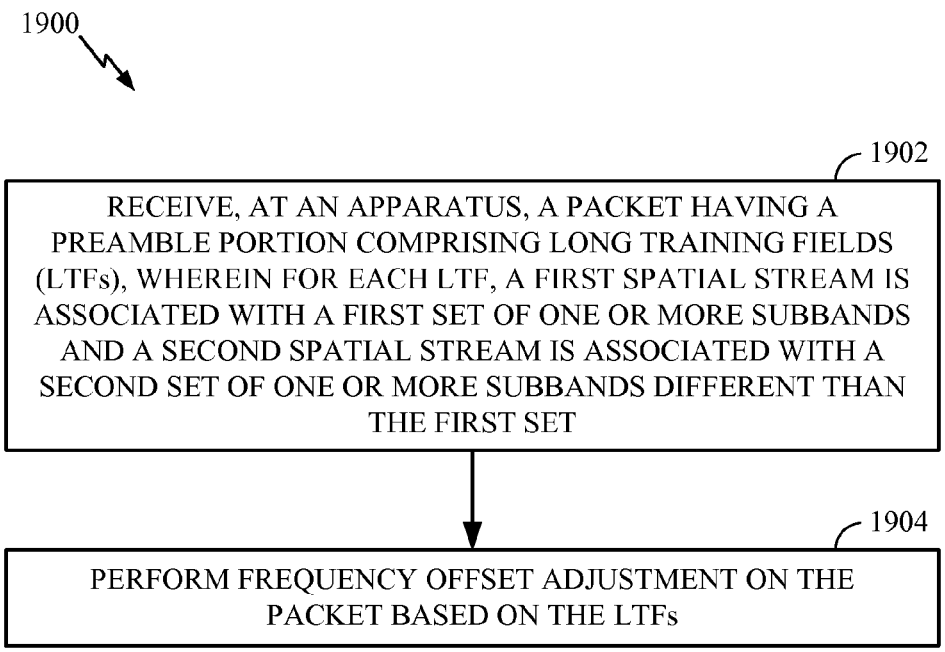
FIG. 19 is a flow diagram of example operations for performing frequency offset adjustment based on subband-based LTFs, in accordance with certain aspects of the present disclosure.
Figure 19A:
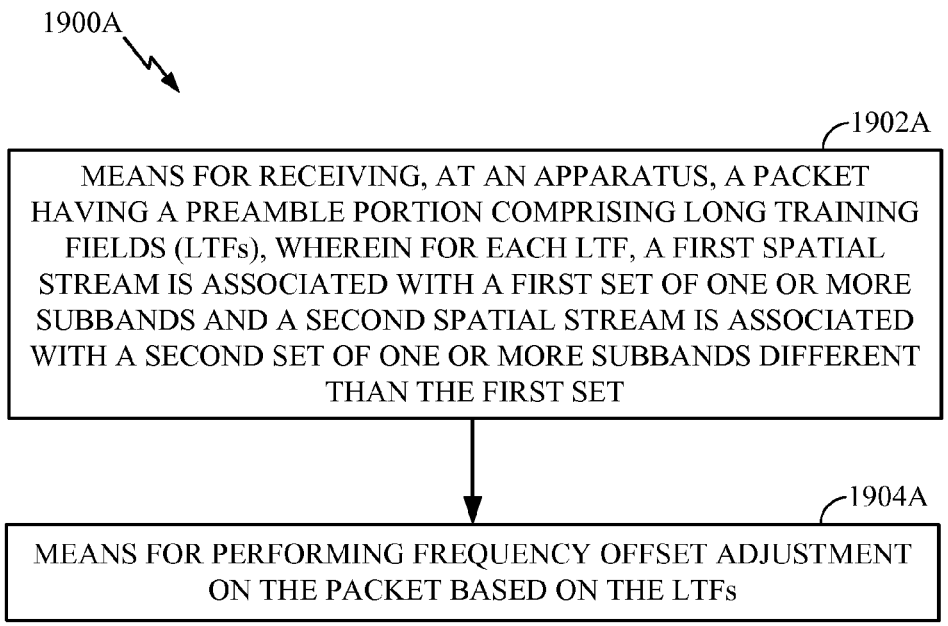
FIG. 19A illustrates example means capable of performing the operations shown in FIG. 19.

FIG. 19 is a flow diagram of example operations 1900 for performing frequency offset adjustment based on subband-based LTFs, in accordance with certain aspects of the present disclosure. The operations 1900 may be performed by an apparatus, such as an AP 110.

The operations 1900 may begin, at 1902, with the apparatus receiving a packet (e.g., a HEW packet 150 as illustrated in FIGS. 1 and 2) having a preamble portion including LTFs (e.g., in accordance with one of the example formats shown in FIGS. 3A-4). For each LTF, a first spatial stream is associated with a first set of one or more subbands and a second spatial stream is associated with a second set of one or more subbands different than the first set. At 1904, the apparatus performs frequency offset adjustment on the packet based on the LTFs.

According to certain aspects, a number of the LTFs is one more than a number of spatial streams received by the apparatus. For certain aspects, a last one of the LTFs may be a copy of the first one of the LTFs.

According to certain aspects, each of the LTFs includes subbands designated for each spatial stream of each user in an uplink (UL) multiuser (MU) multiple-input, multiple-output (MIMO) transmission. A pattern of the subbands designated for each spatial stream of each user may be shifted between two consecutive LTFs. For certain aspects, the pattern of the subbands designated for each spatial stream is shifted by one subband, while for other aspects, the pattern of the subbands may be shifted by 2 or more subbands.

According to certain aspects, for each LTF, a third spatial stream is associated with the first set of subbands, the first spatial stream is associated with a first subset of tones in the first set of subbands, the third spatial stream is associated with a second subset of tones in the first set of subbands, and the first subset of tones is interleaved with the second subset of tones. For certain aspects, a fourth spatial stream is associated with the second set of subbands, the second spatial stream is associated with a third subset of tones in the second set of subbands, the fourth spatial stream is associated with a fourth subset of tones in the second set of subbands, and the third subset of tones is interleaved with the fourth subset of tones. In this case, the preamble portion may include four LTFs, for example. For other aspects, for each LTF, fourth and fifth spatial streams are associated with the first set of subbands, the fourth spatial stream is associated with a third subset of tones in the first set of subbands, the fifth spatial stream is associated with a fourth subset of tones in the first set of subbands, and the first, second, third, and fourth subsets of tones are interleaved.

Embedding the HE-SIG Field

Rather than including a separate HE-SIG field in the preamble, the HE-SIG field information may be embedded in the LTFs using any of various methods for certain aspects. For example, in a first option, un-coded binary phase shift keying (BPSK) data may be carried on some of the tones and involve interpolation on these tones to demodulate HE-SIG information.

As a second example option, the repeated LTF symbol (used for frequency offset correction) may be used to carry these bits through a polarity change on some of the tones. This exploits per-tone SNR gain due to transmission by a user on only a subset of tones. There may be at least two methods for accomplishing this. In one case, polarity may be estimated first, and then all of a user's tones may be used for frequency offset estimation. This case utilizes the fact that phase change due to frequency offset will be much less than $\pi$ between the two copies, and hence, a sign change can be easily detected. In another case, a subset of one user's tones in repeated LTF symbol may be utilized for frequency offset correction.

Example Channel Estimation Techniques Based on LTFs

For certain aspects, HE-LTFs may be optimized for 4× symbol duration mode. With this symbol duration, the LTF becomes 4× longer in duration (with symbols having a duration of 16 µs, rather than 4 µs (=1× symbol duration)). If no changes are made, the preamble overhead becomes excessive. However, one may note that there are four times more samples (in frequency) of the channel for the same bandwidth (BW). Therefore, it may be possible to allow interpolation and reduce the number of LTFs by up to a factor of 4, such that each stream visits as few as one quarter of the tones available in the 4× symbol duration mode.

The present disclosure provides three more options for channel estimation, which are especially useful in the 4× lengthened symbol case. Option A involves tone-interleaved LTFs followed by a tone-interleaved phase-correction LTF symbol. Option B entails employing a 4-user orthogonal cover (like a P matrix) in the frequency domain (part of the band assigned to one group of 4 users when the number of users>4). This is equivalent to cyclic shift diversity (CSD) for some orthogonal covers. Option C involves using a low-rank (number of tones<number of ss) orthogonal cover (like a P matrix) in the frequency domain.

Figure 20:
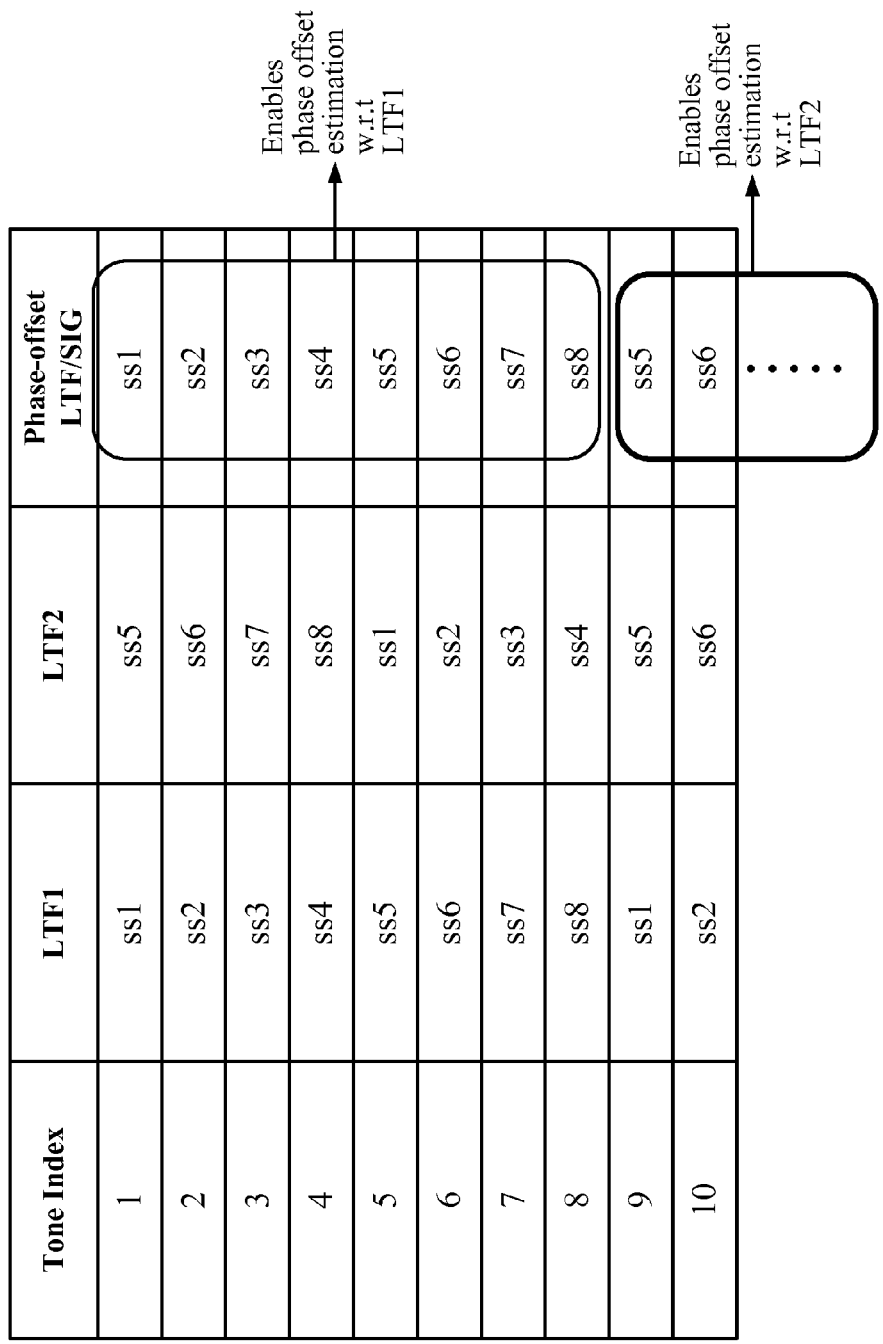
FIG. 20 illustrates an option for channel estimation using tone-interleaved LTFs followed by a tone-interleaved phase-correction LTF symbol, in accordance with certain aspects of the present disclosure.

FIG. 20 illustrates an example design of LTFs for 4× symbol duration in accordance with Option A. In this example, there are 8 users with 1 spatial stream each, all streams active on each symbol. Since there is a 4× symbol duration, it is sufficient to know the channel on a subset of the tones, as described above. As per the design in FIG. 20, LTF1 and LTF2 ensure that the channel can be estimated for each user on 1 in 4 tones for each stream.

In the example of FIG. 20, the additional LTF contains a mixture of the first two LTFs, and this can be used to estimate the per-user, per-LTF phase offset. The phase-offset LTF has 16 phases to estimate, and there are approximately 242/16~16 tones available for each phase to be estimated. 32 tones contain complete power of one user, so 16 tones are 3 dB weaker phase estimation than in the single user case.

Option A may have certain disadvantages. Different streams may have different interpolation specifications. For example, some streams have edge subcarriers available and some do not. The channel estimation quality on different streams may end up being unequal. In general, performance of Option A is also highly dependent on the interpolation algorithm used.

Figure 21:
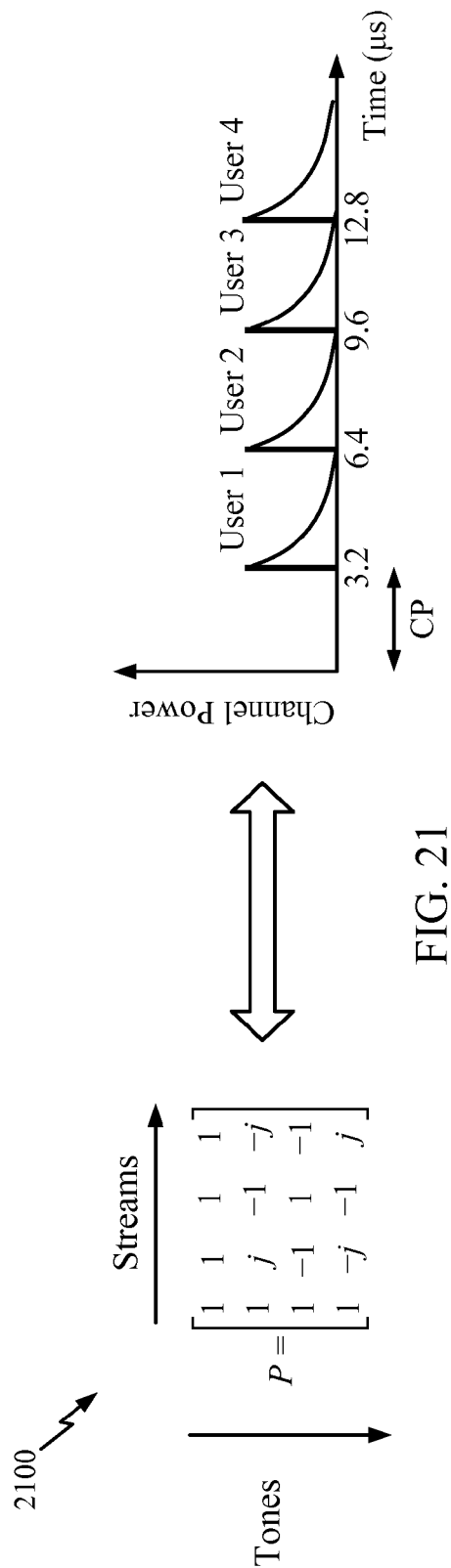
FIG. 21 illustrates an option for channel estimation using an orthogonal cover in the frequency domain, in accordance with certain aspects of the present disclosure.

FIG. 21 illustrates Option B, where an orthogonal cover in frequency is implemented for 4 users, in accordance with certain aspects of the present disclosure. Every set of 4 tones has an orthogonal mapping like the matrix 2100 illustrated in FIG. 21. This mapping is equivalent to each user being offset by [0, 3.2, 6.4, 9.6] µs CSD in an OFDM symbol which has a 12.8 µs symbol with 3.2 µs cyclic prefix (CP). This orthogonal mapping is just an example; there may be other mappings to enable separation of streams through frequency-domain processing or through time-domain processing. However, not every orthogonal cover in frequency will have an intuitive CSD like counterpart in the time domain. Note that the ability to orthogonalize users in frequency is related to each user's impulse response decaying soon enough such that four users' impulse responses can be orthogonalized in the time domain in a non-overlapping fashion.

Figure 22:
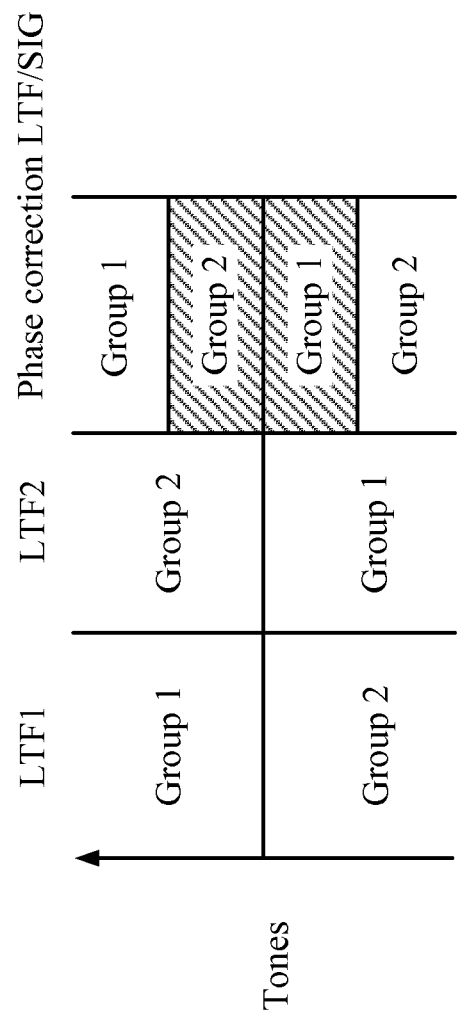
FIG. 22 illustrates using the orthogonal cover of FIG. 21 for an example B-user case, where the two LTF symbols are followed by a phase-correction LTF symbol, in accordance with certain aspects of the present disclosure.

FIG. 22 illustrates another example of implementing Option B with an 8-user case. Using the orthogonal cover illustrated in FIG. 21, both sides of DC have a separate set of users: Group 1 corresponds to one set of 4 users, while Group 2 corresponds to another set of 4 users. A potential disadvantage of this approach is that since both sides of DC have a different set of users, the receive (Rx) processing may not occur in a very intuitive time-domain manner.

According to certain aspects of the present disclosure, (HE-)SIG field information may be embedded on certain tones of the last LTF. For certain aspects, a preference may be given to carry the (HE-)SIG field information on those tones of the last LTF which are a repeat of the LTFs which arrived more recently (e.g., only the tones shown in the shaded sections in the phase correction LTF in FIG. 22). This is to ensure that the phase change on the tones which carry (HE-)SIG field bits is much less than $\pi$.

Figure 23:
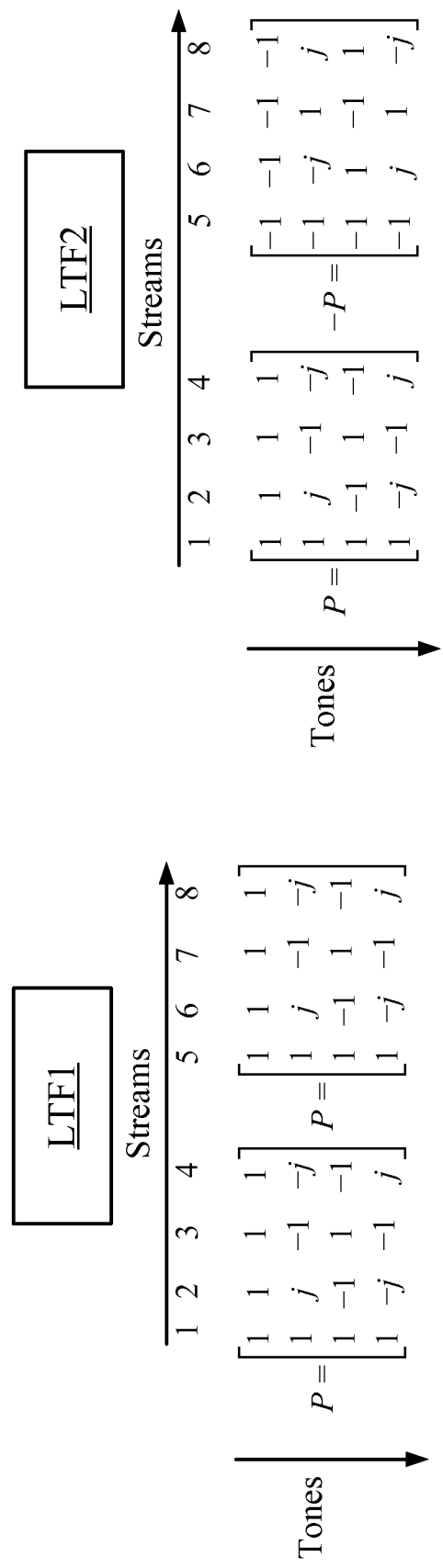
FIG. 23 illustrates an option for channel estimation using an orthogonal cover in the frequency domain, when the number of tones in the orthogonal cover is less than the number of spatial streams, in accordance with certain aspects of the present disclosure.

FIG. 23 illustrates implementing Option C, in which an orthogonal cover in frequency is employed for 8 users (8 spatial streams) on every set of 4 tones using a 4×8 matrix (where the number of columns corresponds to spatial streams and the number of rows corresponds to tones). Since in the 4×8 orthogonal cover shown in FIG. 24, the number of streams are greater than the number of tones, a linear combination of the channels of each stream may be computed at each LTF. In particular, in LTF1 the following combinations may be computed: ss1+ss5, ss2+ss6, ss3+ss7, and ss4+ss8 (i.e., [P]+[P]), and in LTF2, the following combinations may be computed: ss1−ss5, ss2−ss6, ss3−ss7, and ss4−ss8 (i.e., [P]+−[P]). Consequently, the channel may be estimated using the two LTFs.

Figure 24:
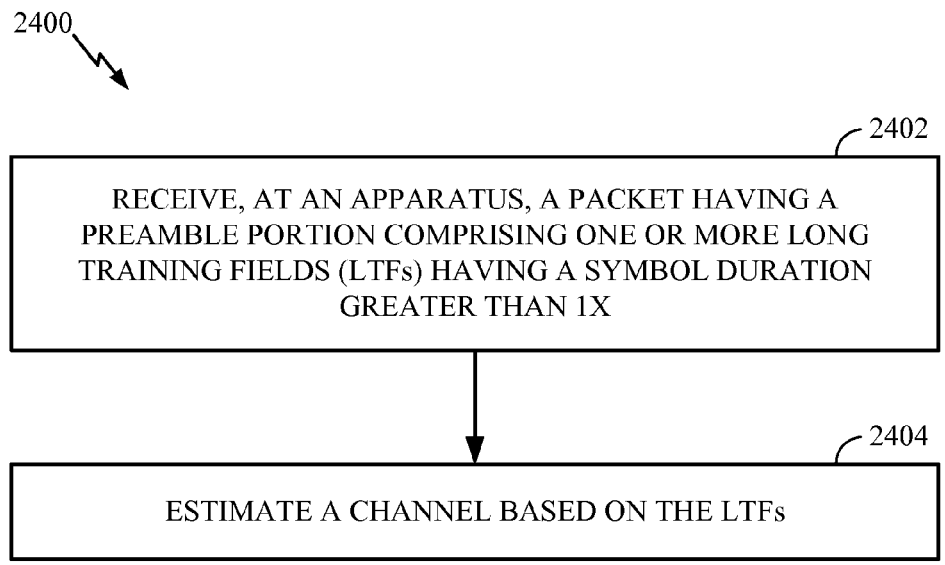
FIG. 24 is a flow diagram of example operations for estimating a channel based on LTFs having a symbol duration greater than 1×, in accordance with certain aspects of the present disclosure.
Figure 24A:
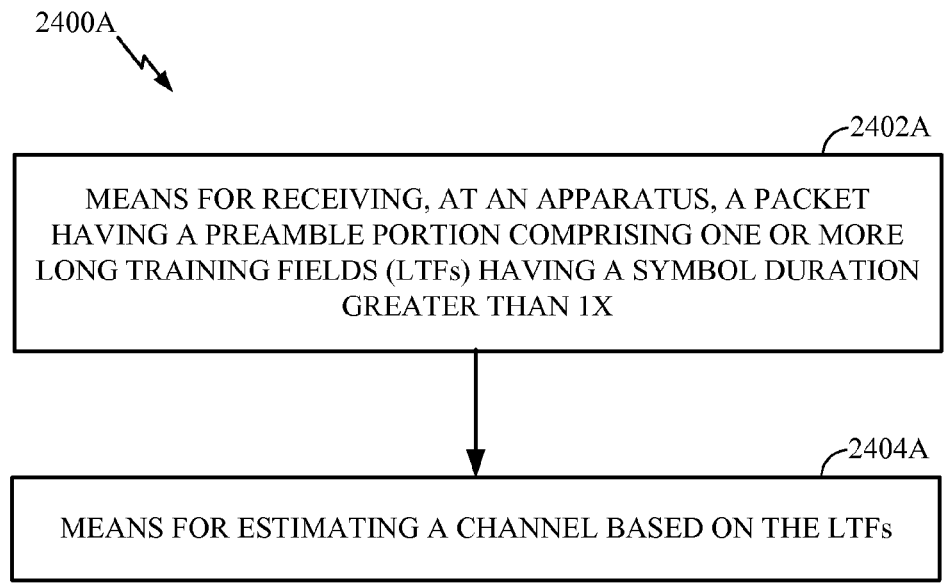
FIG. 24A illustrates example means capable of performing the operations shown in FIG. 24.

FIG. 24 is a flow diagram of example operations 2400 for estimating a channel based on LTFs having a symbol duration greater than 1×, in accordance with certain aspects of the present disclosure. The operations 2400 may be performed by an apparatus, such as an AP 110.

The operations 2400 may begin, at 2402, with the apparatus receiving a packet (e.g., a HEW packet 150 as portrayed in FIGS. 1 and 2) having a preamble portion including one or more LTFs (e.g., in accordance with one of the example formats shown in FIGS. 3A-4). At least one of the LTFs is composed of a symbol having a duration greater than 4 µs (i.e., a symbol duration greater than 1×, such as a symbol duration of 4×=16 µs). At 2404, the apparatus may estimate a channel based on the LTFs.

According to certain aspects, the one or more LTFs include tone-interleaved LTFs. For certain aspects, the tone-interleaved LTFs include one more than a number of LTFs equal to any integer in an interval ranging from a number of spatial streams ($N_{SS}$) divided by a symbol-duration factor (e.g., 4 for 4× symbol duration) to the number of spatial streams (i.e., [$N_{SS}$/symbol-duration-factor, $N_{SS}$]). A last one of the tone-interleaved LTFs may be a copy of different portions of one or more prior LTFs of the tone-interleaved LTFs, according to a pattern. In this case, the operations 2400 may further include performing frequency offset adjustment on the packet based on the tone-interleaved LTFs. Performing the frequency offset adjustment may involve correcting phase differences for a number of tone subsets between the different portions of the one or more prior LTFs and the last one of the tone-interleaved LTFs, according to the pattern. For certain aspects, using the phase differences entails determining a phase offset for each of the prior LTFs for each of the spatial streams. As an example, the symbol duration may be 4×, the number of spatial streams may be 8, and there may be three tone-interleaved LTFs.

According to certain aspects, the preamble portion includes a first signal (SIG) field, wherein the one or more LTFs are located subsequent to the first SIG field, and at least one second SIG field, wherein all SIG fields in the preamble portion, other than the first SIG field, are subsequent to the one or more LTFs.

According to certain aspects, the one or more LTFs include one or more high efficiency long training fields (HE-LTFs), and the preamble portion further includes a high efficiency signal (HE-SIG) field located subsequent to the HE-LTFs.

Figure 25:
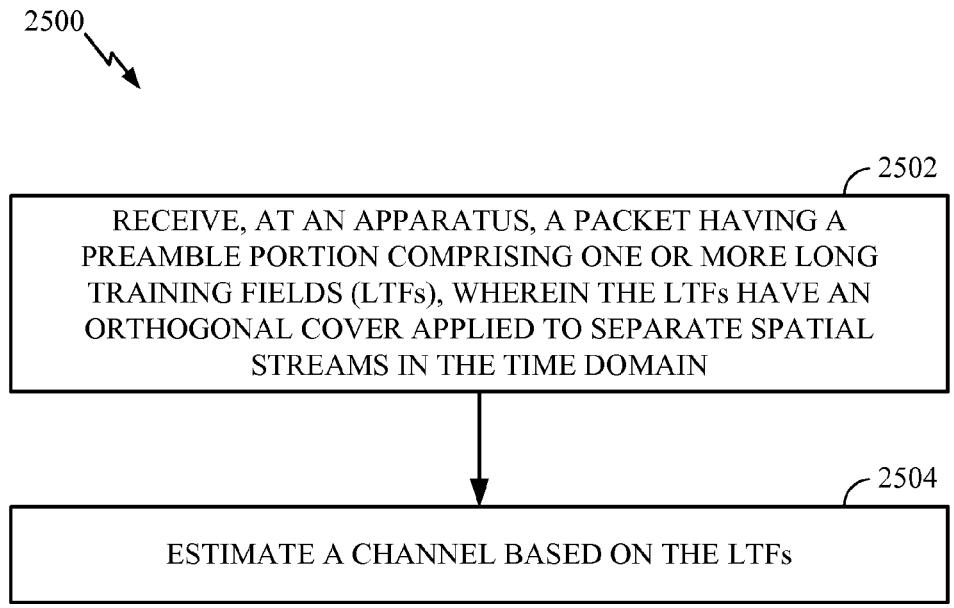
FIG. 25 is a flow diagram of example operations for estimating a channel based on LTFs having an orthogonal cover applied thereto, in accordance with certain aspects of the present disclosure.
Figure 25A:
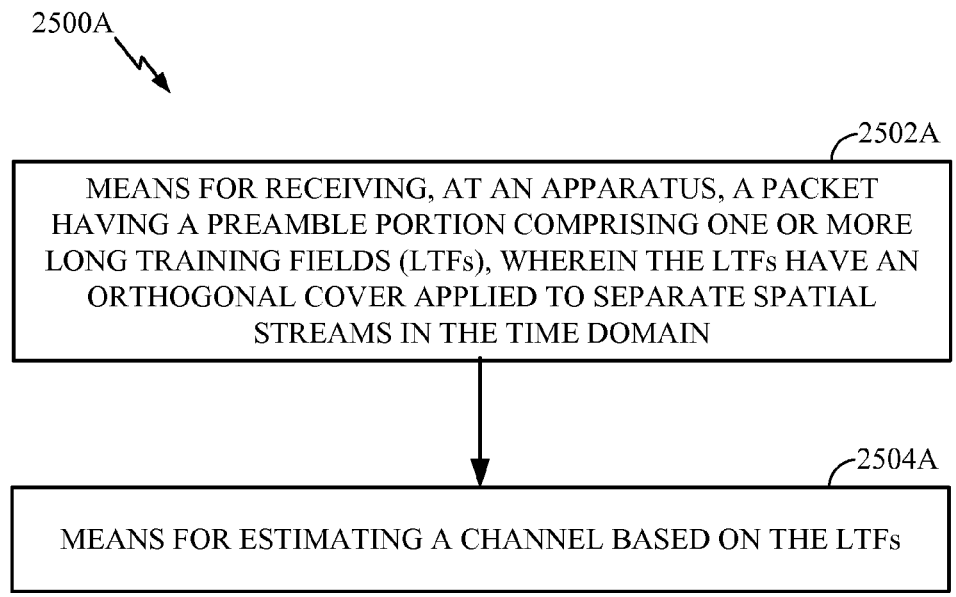
FIG. 25A illustrates example means capable of performing the operations shown in FIG. 25.

FIG. 25 is a flow diagram of example operations 2500 for estimating a channel based on LTFs having an orthogonal cover applied thereto, in accordance with certain aspects of the present disclosure. The operations 2500 may be performed by an apparatus, such as an AP 110.

The operations 2500 may begin, at 2502, with the apparatus receiving a packet (e.g., a HEW packet 150 as depicted in FIGS. 1 and 2) having a preamble portion including one or more LTFs (e.g., in accordance with one of the example formats shown in FIGS. 3A-4). The LTFs have a mapping (e.g., an orthogonal cover) applied to them to separate spatial streams in the time domain. At 2504, the apparatus may estimate a channel based on the LTFs.

According to certain aspects, the orthogonal cover is applied in the frequency domain to a set of four tones and four spatial streams. For certain aspects, the orthogonal cover is a matrix equal to $$\begin{bmatrix} 1 & 1 & 1 & 1 \\ 1 & j & -1 & -j \\ 1 & -1 & 1 & -1 \\ 1 & -j & -1 & j \end{bmatrix}$$

Rows of the matrix correspond to different tones, and columns of the matrix correspond to different spatial streams. For other aspects, the orthogonal cover is a matrix equal to $$\begin{bmatrix} 1 & 1 & 1 & 1 & -1 & -1 & -1 & -1 \\ 1 & j & -1 & -j & -1 & -j & 1 & j \\ 1 & -1 & 1 & -1 & -1 & 1 & -1 & 1 \\ 1 & -j & -1 & j & -1 & j & 1 & -j \end{bmatrix}$$

According to certain aspects, the one or more LTFs have a symbol duration greater than 1×. For certain aspects, the one or more LTFs include one more than a number of LTFs equal to any integer in an interval ranging from a number of spatial streams ($N_{SS}$) divided by a symbol-duration factor (e.g., 4 for 4× symbol duration) to the number of spatial streams (i.e., [$N_{SS}$/symbol-duration-factor, $N_{SS}$]). A last one of the LTFs may be a copy of different portions of one or more LTFs prior to the last one of the LTFs, according to a pattern. In this case, the operations 2500 may further include performing frequency offset adjustment on the packet based on the LTFs. Performing the frequency offset adjustment may involve correcting phase differences for a number of tone subsets between the different portions of the one or more prior LTFs and the last one of the LTFs, according to the pattern. For certain aspects, correcting the phase differences entails determining a phase offset for each of the prior LTFs for each of the spatial streams.

According to certain aspects, different groups of users are included in the orthogonal covers for different parts of the band (as illustrated in FIG. 22).

Figure 5A:
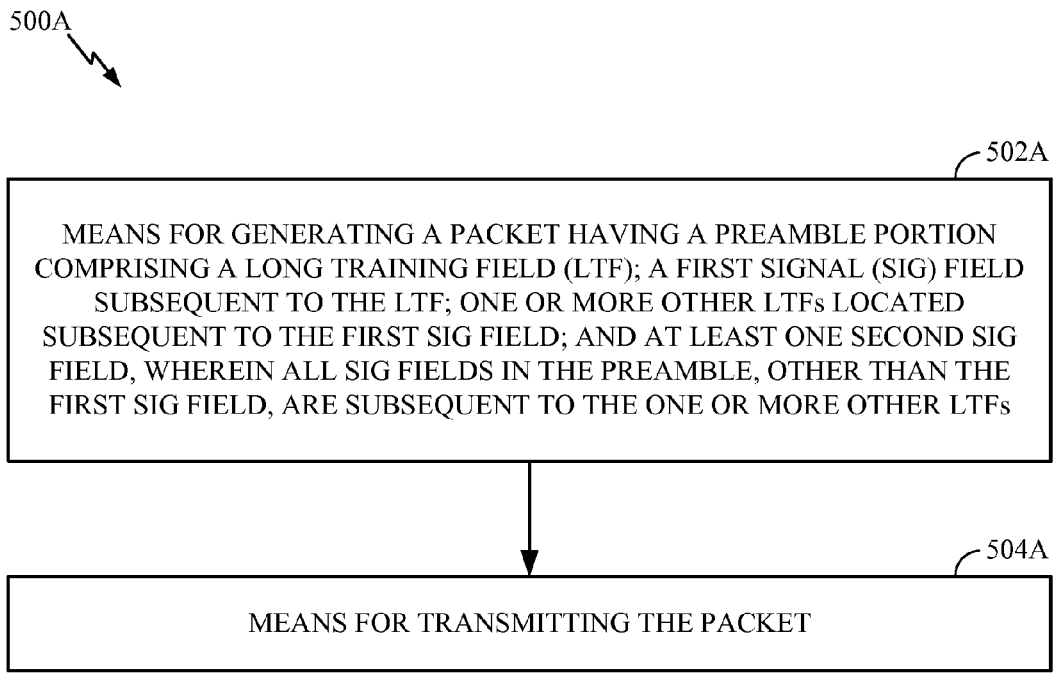
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 illustrated in FIG. 5 correspond to means 500A illustrated in FIG. 5A.

For example, means for transmitting may comprise a transmitter (e.g., the transmitter unit 222) and/or an antenna(s) 224 of the access point 110 or the transmitter unit 254 and/or antenna(s) 252 of the user terminal 120 illustrated in FIG. 2. Means for receiving may comprise a receiver (e.g., the receiver unit 222) and/or an antenna(s) 224 of the access point 110 or the receiver unit 254 and/or antenna(s) 254 of the user terminal 120 illustrated in FIG. 2. Means for processing, means for generating, means for performing frequency offset adjustment, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art.

Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for handling residual frequency offset error, comprising:
   receiving, at an apparatus, a packet having a preamble portion comprising tone-interleaved long training fields (LTFs) having interleaved tones designated for each spatial stream of each user in an uplink (UL) multiuser (MU) transmission, wherein in each tone-interleaved LTF, each spatial stream is associated with a subset of tones, wherein a first spatial stream is associated with a first subset of tones and a second spatial stream is associated with a second subset of the tones interleaved with the first subset of the tones, wherein the interleaved tones are arranged in a pattern, and wherein the pattern is shifted between two consecutive tone-interleaved LTFs; and
   performing frequency offset adjustment on the packet based on the tone-interleaved LTFs.

2. The method of claim 1, wherein a number of the LTFs is one more than a number of spatial streams received by the apparatus.

3. The method of claim 2, wherein a last one of the tone-interleaved LTFs is a copy of the first one of the tone-interleaved LTFs.

4. The method of claim 3, wherein performing the frequency offset adjustment comprises using phase differences for a number of tone subsets between the first and the last ones of the tone-interleaved LTFs to determine a frequency offset, wherein the number of the tone subsets equals the number of spatial streams.

5. The method of claim 1, wherein performing the frequency offset adjustment comprises performing a phase offset adjustment to correct for phase offsets that arise due to frequency errors.

6. The method of claim 1, wherein at least one of the tone-interleaved LTFs comprises a symbol having a duration greater than 4 µs.

7. The method of claim 1, wherein the pattern of the interleaved tones is shifted by one tone.

8. The method of claim 1, wherein the pattern of the interleaved tones is shifted by 2 or by 4 tones.

9. The method of claim 8, wherein each spatial stream covers one half or one quarter of all tones for the tone-interleaved LTFs.

10. The method of claim 9, further comprising interpolating missing tones before performing the frequency offset adjustment.

11. The method of claim 2, wherein a last one of the tone-interleaved LTFs is a copy of different portions of one or more prior LTFs of the tone-interleaved LTFs, according to a pattern.

12. The method of claim 11, wherein performing the frequency offset adjustment comprises correcting phase differences for a number of tone subsets between the different portions of the one or more prior LTFs and the last one of the tone-interleaved LTFs, according to the pattern.

13. The method of claim 12, wherein correcting the phase differences comprises determining a phase offset for each of the prior LTFs for each of the spatial streams.

14. The method of claim 11, further comprising:
   extracting information in a signal (SIG) field embedded in the last one of the tone-interleaved LTFs; and
   processing the packet based on the information in the SIG field.

15. The method of claim 14, wherein the extracting comprises detecting polarity changes on tones in the last one of the tone-interleaved LTFs.

16. The method of claim 1, wherein in each tone-interleaved LTF, the first and second subsets of the tones are associated with a first set of one or more subbands, a third spatial stream is associated with a third subset of tones, a fourth spatial stream is associated with a fourth subset of tones interleaved with the third subset of the tones, and the third and fourth subsets of the tones are associated with a second set of one or more subbands different than the first set.

17. An apparatus for handling residual frequency offset error, comprising:
   a receiver configured to receive a packet having a preamble portion comprising tone-interleaved long training fields (LTFs) having interleaved tones designated for each spatial stream of each user in an uplink (UL) multiuser (MU) transmission, wherein in each tone-interleaved LTF, a first spatial stream is associated with a first subset of tones and a second spatial stream is associated with a second subset of the tones interleaved with the first subset of the tones, wherein the interleaved tones are arranged in a pattern, and wherein the pattern is shifted between two consecutive tone-interleaved LTFs; and
   a processing system configured to perform frequency offset adjustment on the packet based on the tone-interleaved LTFs.

18. The apparatus of claim 17, wherein in each tone-interleaved LTF, the first and second subsets of the tones are associated with a first set of one or more subbands, a third spatial stream is associated with a third subset of tones, a fourth spatial stream is associated with a fourth subset of tones interleaved with the third subset of the tones, and the third and fourth subsets of the tones are associated with a second set of one or more subbands different than the first set.

19. The apparatus of claim 17, wherein the processing system is configured to perform the frequency offset adjustment by performing a phase offset adjustment to correct for phase offsets that arise due to frequency errors.

20. The apparatus of claim 17, wherein a number of the LTFs is one more than a number of spatial streams received by the apparatus.

21. The apparatus of claim 20, wherein a last one of the tone-interleaved LTFs is a copy of the first one of the tone-interleaved LTFs.

22. The apparatus of claim 21, wherein the processing system is configured to perform the frequency offset adjustment by using phase differences for a number of tone subsets between the first and the last ones of the tone-interleaved LTFs to determine a frequency offset, wherein the number of the tone subsets equals the number of spatial streams.

23. The apparatus of claim 17, wherein at least one of the tone-interleaved LTFs comprises a symbol having a duration greater than 4 μs.

24. The apparatus of claim 20, wherein a last one of the tone-interleaved LTFs is a copy of different portions of one or more prior LTFs of the tone-interleaved LTFs, according to a pattern.

25. The apparatus of claim 17, wherein the pattern of the interleaved tones is shifted by one tone.

26. The apparatus of claim 17, wherein the pattern of the interleaved tones is shifted by 2 or by 4 tones.

27. The apparatus of claim 26, wherein each spatial stream covers one half or one quarter of all tones for the tone-interleaved LTFs.

28. The apparatus of claim 27, wherein the processing system is further configured to interpolate missing tones before performing the frequency offset adjustment.

29. The apparatus of claim 24, wherein the processing system is further configured to:
    extract information in a signal (SIG) field embedded in the last one of the tone-interleaved LTFs; and
    process the packet based on the information in the SIG field.

30. The apparatus of claim 24, wherein the processing system is configured to perform the frequency offset adjustment by correcting phase differences for a number of tone subsets between the different portions of the one or more prior LTFs and the last one of the tone-interleaved LTFs, according to the pattern.

31. The apparatus of claim 30, wherein correcting the phase differences comprises determining a phase offset for each of the prior LTFs for each of the spatial streams.

32. The apparatus of claim 29, wherein the processing system is configured to extract the information by detecting polarity changes on tones in the last one of the tone-interleaved LTFs.

33. An apparatus for handling residual frequency offset error, comprising:
    means for receiving a packet having a preamble portion comprising tone-interleaved long training fields (LTFs) having interleaved tones designated for each spatial stream of each user in an uplink (UL) multiuser (MU) transmission, wherein in each tone-interleaved LTF, a first spatial stream is associated with a first subset of tones and a second spatial stream is associated with a second subset of the tones interleaved with the first subset of the tones, wherein the interleaved tones are arranged in a pattern, and wherein the pattern is shifted between two consecutive tone-interleaved LTFs; and
    means for performing frequency offset adjustment on the packet based on the tone-interleaved LTFs.

* * * * *